US006990801B2

(12) United States Patent
Kitahara

(10) Patent No.: US 6,990,801 B2
(45) Date of Patent: Jan. 31, 2006

(54) COMBUSTION CONTROL APPARATUS FOR INTERNAL COMBUSTION ENGINE

(75) Inventor: Yasuhisa Kitahara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 44 days.

(21) Appl. No.: 10/895,409

(22) Filed: Jul. 21, 2004

(65) Prior Publication Data

US 2005/0039439 A1 Feb. 24, 2005

(30) Foreign Application Priority Data

Jul. 31, 2003 (JP) .................................... 2003-284328

(51) Int. Cl.
*F01N 3/00* (2006.01)

(52) U.S. Cl. .............................. 60/285; 60/274; 60/278; 60/295; 60/301; 60/311

(58) Field of Classification Search .................. 60/274, 60/276, 278, 285, 295, 297, 301, 311
See application file for complete search history.

(56) References Cited

U.S. PATENT DOCUMENTS

| | | | | | |
|---|---|---|---|---|---|
| 5,960,765 | A | * | 10/1999 | Iida et al. .................... | 123/295 |
| 6,209,515 | B1 | * | 4/2001 | Gotoh et al. ................. | 123/305 |
| 6,269,634 | B1 | * | 8/2001 | Yokota et al. ................ | 60/286 |
| 6,276,130 | B1 | * | 8/2001 | Ito et al. ....................... | 60/278 |
| 6,370,871 | B2 | * | 4/2002 | Suzuki et al. ................. | 60/286 |
| 6,470,850 | B1 | * | 10/2002 | Sasaki et al. ................ | 123/305 |
| 6,546,721 | B2 | * | 4/2003 | Hirota et al. .................. | 60/297 |
| 6,581,372 | B2 | * | 6/2003 | Sasaki et al. ................. | 60/278 |
| 6,772,585 | B2 | * | 8/2004 | Iihoshi et al. ................. | 60/277 |
| 6,782,696 | B2 | * | 8/2004 | Shigahara et al. ............ | 60/285 |
| 6,804,952 | B2 | * | 10/2004 | Sasaki et al. ................. | 60/284 |
| 2003/0061803 | A1 | * | 4/2003 | Iihoshi et al. ................. | 60/285 |

FOREIGN PATENT DOCUMENTS

| EP | 1 035 315 A2 | 9/2000 |
|---|---|---|
| JP | 2000-320386 A | 11/2000 |

OTHER PUBLICATIONS

U.S. Appl. No. 10/895,423, filed Jul. 21, 2004, Kitahara.
U.S. Appl. No. 10/895,424, filed Jul. 21, 2004, Nishizawa et al.
U.S. Appl. No. 10/902,422, filed Jul. 30, 2004, Nishizawa et al.
U.S. Appl. No. 10/895,407, filed Jul. 21, 2004, Ishibashi et al.
U.S. Appl. No. 10/895,335, filed Jul. 21, 2004, Kitahara.
U.S. Appl. No. 10/902,163, filed Jul. 30, 2004, Kitahara.
U.S. Appl. No. 10/895,408, filed Jul. 21, 2004, Kitahara.
U.S. Appl. No. 10/895,286, filed Jul. 21, 2004, Kitahara.
U.S. Appl. No. 10/902,162, filed Jul. 30, 2004, Todoroki et al.

* cited by examiner

*Primary Examiner*—Thomas Denion
*Assistant Examiner*—Diem Tran
(74) *Attorney, Agent, or Firm*—Foley & Lardner LLP

(57) ABSTRACT

A combustion control apparatus operates an internal combustion engine in a split retard combustion mode during regenerating an exhaust purifier such as a particulate filter. In the split retard combustion mode, the combustion control apparatus controls a first fuel injection to cause preliminary combustion at or near top dead center, and controls a second fuel injection to cause main combustion after an end of the preliminary combustion. In this manner, the combustion control apparatus controls an exhaust gas temperature, or an exhaust air-fuel ratio, without increasing exhaust smoke. During the split retard combustion mode, the combustion control apparatus controls an EGR rate of the engine. The EGR rate in the split retard combustion mode is set lower than in the normal combustion mode, in each operating point of the engine.

16 Claims, 26 Drawing Sheets

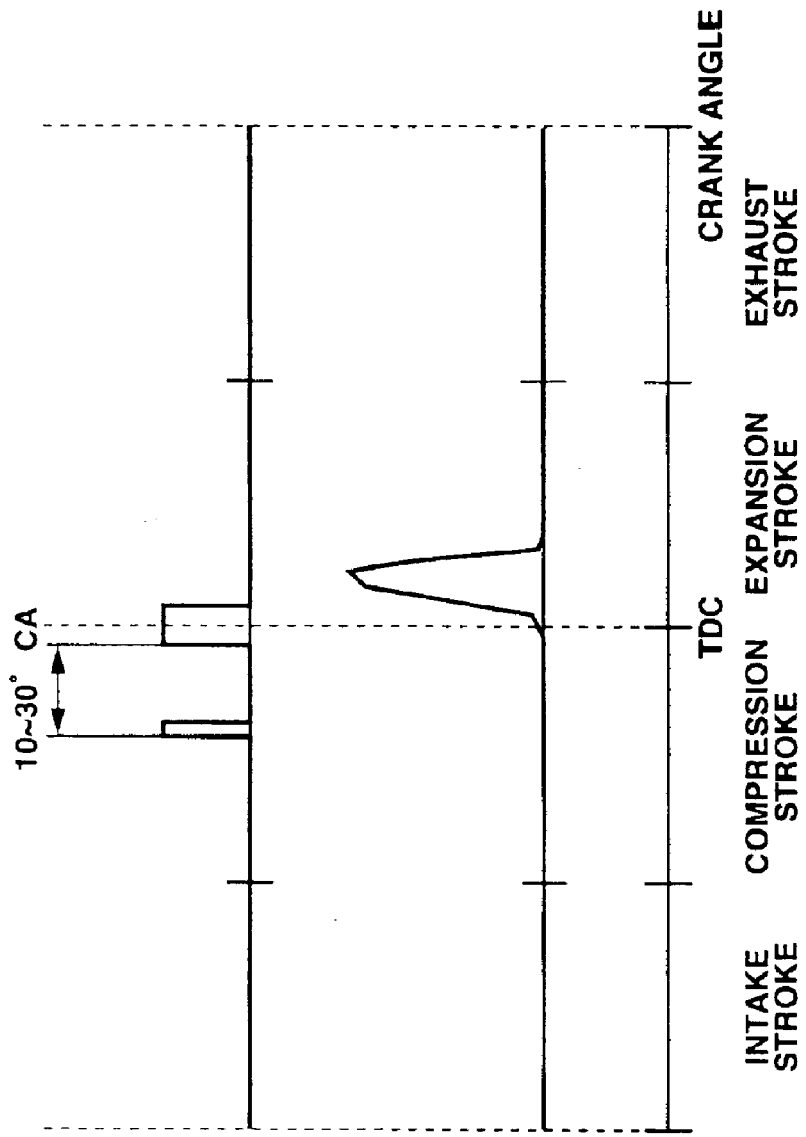

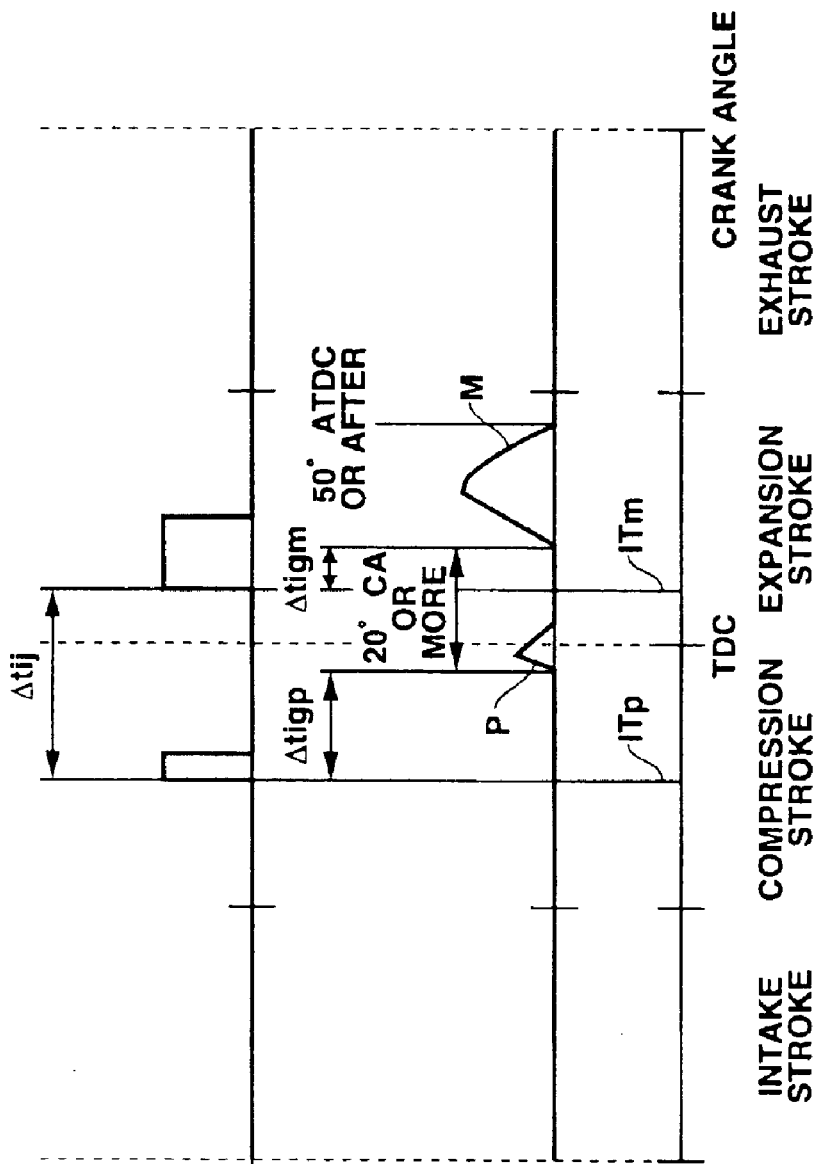

SECOND FUEL INJECTION TIMING ITm

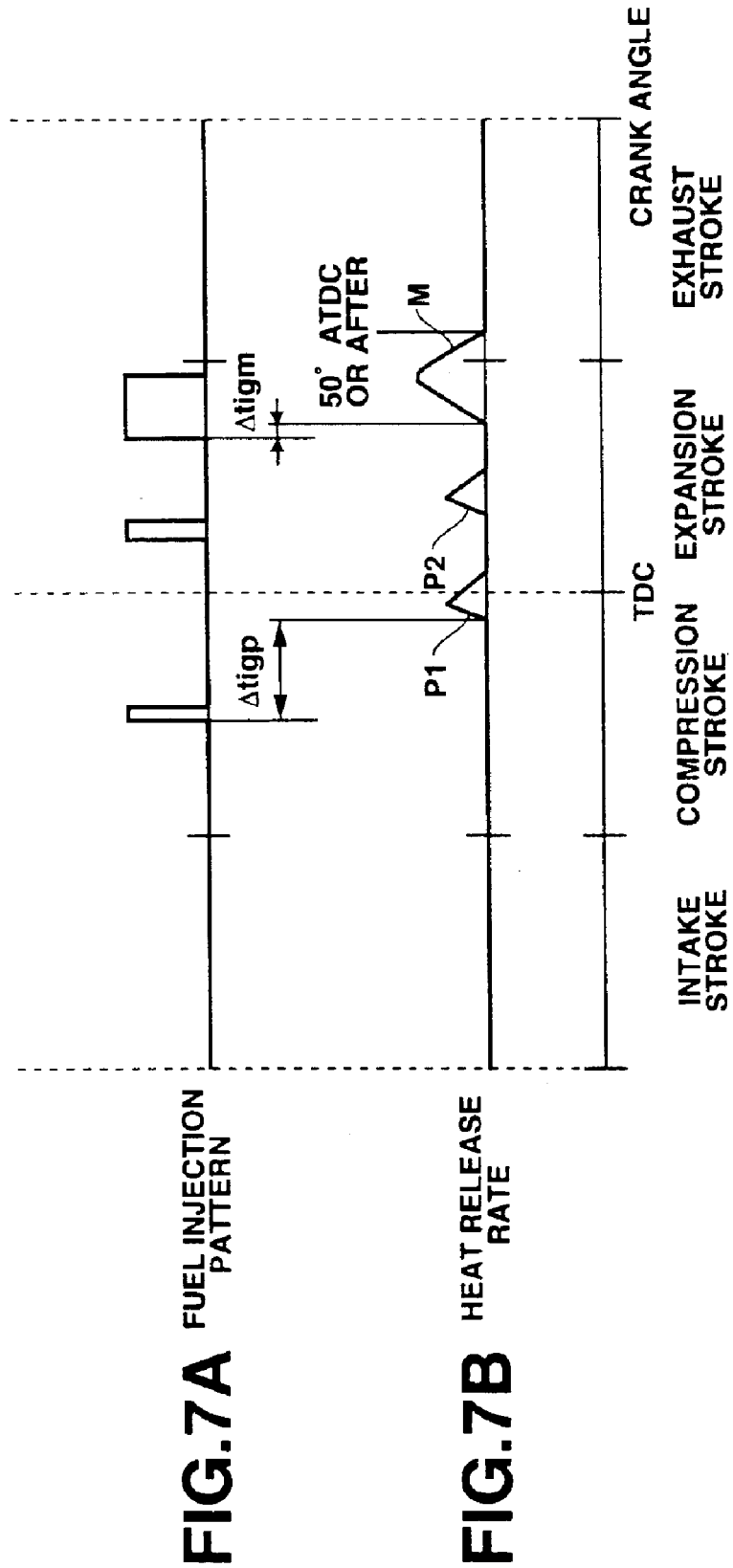
FIG.7A FUEL INJECTION PATTERN
FIG.7B HEAT RELEASE RATE

COMBUSTION CONTROL APPARATUS FOR INTERNAL COMBUSTION ENGINE

BACKGROUND OF THE INVENTION

The present invention relates generally to control apparatuses for internal combustion engines, and more particularly to a combustion control apparatus for an internal combustion engine with an exhaust purifier such as a particulate filter, which is configured to decrease an excess air ratio of the engine, and to raise an exhaust gas temperature of the engine, without increasing exhaust smoke.

In recent years, there have been disclosed various techniques of raising an exhaust gas temperature to activate an exhaust purifier for an engine with an exhaust purifier in an exhaust gas passage. One such technique is disclosed in Japanese Patent Provisional Publication No. 2000-320386, especially in paragraphs [0106] through [0111]. In this technique, a basic fuel injection quantity to produce a desired engine torque is calculated in accordance with an operating condition of the engine. The basic fuel injection quantity of fuel is supplied to a cylinder of the engine by multiple fuel injections near top dead center (TDC).

On the other hand, a known method of removing particulate matter (PM) from exhaust gas employs a particulate filter. The particulate filter includes a porous filter element to filter exhaust gas to remove PM. When the accumulation quantity of PM in the particulate filter exceeds a specific quantity, the backpressure of the engine rises, to cause a trouble in the operation of the engine. Accordingly, it is necessary to dispose of PM at intervals to regenerate the particulate filter. A known method of PM regeneration raises exhaust gas temperature to raise a bed temperature of the particulate filter, which results in burning PM.

SUMMARY OF THE INVENTION

However, the previously discussed technique is fraught with the following difficulty. The split fuel injection in the technique results in continuous combustion. In other words, a following fuel is injected into the flame produced by a preceding fuel injection. Accordingly, diffusive combustion process is predominant in the combustion produced by the second or later fuel injection. In diffusive combustion, decreasing excess air ratio leads to increasing exhaust smoke. Though this combustion control can raise the exhaust gas temperature, it has a difficulty of decreasing the excess air ratio in view of exhaust smoke. Therefore, this technique is not suitable for regeneration of the particulate filter that needs a decrease in the excess air ratio to supply oxygen for burning PM.

Accordingly, it is an object of the present invention to provide a combustion control apparatus for an internal combustion engine with an exhaust purifier such as a particulate filter, which is configured to decrease an excess air ratio of the engine, and to raise an exhaust gas temperature of the engine, without increasing exhaust smoke.

In order to accomplish the aforementioned and other objects of the present invention, a combustion control apparatus for an internal combustion engine, comprises an exhaust purifier in an exhaust passage of the engine, a combustion controlling actuator for causing combustion in a combustion chamber of the engine, a controller for controlling the combustion controlling actuator, and the controller configured to perform the following, switching a combustion mode between a normal combustion mode and a split retard combustion mode, in accordance with an condition of the exhaust purifier, determining a first EGR rate for the normal combustion mode and a second EGR rate lower than the first EGR rate for the split retard combustion mode, in accordance with an operating point of the engine, performing the following in the normal combustion mode, producing normal combustion to generate an output torque of the engine, and recirculating exhaust gas to the combustion chamber at the first EGR rate, and performing the following in the split retard combustion mode, producing preliminary combustion at or near top dead center, to release a predetermined quantity of heat in the combustion chamber, starting main combustion at a timing later than a start timing of the normal combustion in the normal combustion mode, after an end of the preliminary combustion, to generate the output torque of the engine, and recirculating exhaust gas to the combustion chamber at the second EGR rate.

According to another aspect of the invention, a combustion control apparatus for an internal combustion engine, comprises a fuel injector for injecting fuel directly into a combustion chamber of the engine, an EGR device for recirculating exhaust gas to the combustion chamber, a controller for controlling the fuel injector, and for controlling the EGR device, and the controller configured to perform the following, switching a combustion mode between a normal combustion mode and a split retard combustion mode, in accordance with an operating condition of the engine, determining two different EGR rates of a first EGR rate for the normal combustion mode and a second EGR rate for the split retard combustion mode, in accordance with an operating point of the engine, performing the following in the normal combustion mode, controlling a normal fuel injection to produce normal combustion to generate an output torque of the engine, and recirculating exhaust gas to the combustion chamber at the first EGR rate, and performing the following in the split retard combustion mode, controlling a first fuel injection to produce preliminary combustion at or near top dead center, to release a predetermined quantity of heat, starting a second fuel injection at a timing later than a start timing of the normal fuel injection in the normal combustion mode, to start main combustion after an end of the preliminary combustion, to generate the output torque of the engine, and recirculating exhaust gas to the combustion chamber at the second EGR rate.

According to a further aspect of the invention, a combustion control apparatus for an internal combustion engine, comprises exhaust purifying means for purifying exhaust gas, combustion controlling means for causing combustion in a combustion chamber of the engine, control means for controlling the combustion controlling means, and the control means configured to perform the following, switching a combustion mode between a normal combustion mode and a split retard combustion mode, in accordance with an condition of the exhaust purifying means, determining a first EGR rate for the normal combustion mode and a second EGR rate lower than the first EGR rate for the split retard combustion mode, in accordance with an operating point of the engine, performing the following in the normal combustion mode, producing normal combustion to generate an output torque of the engine, and recirculating exhaust gas to the combustion chamber at the first EGR rate, and performing the following in the split retard combustion mode, producing preliminary combustion at or near top dead center, to release a predetermined quantity of heat in the combustion chamber, starting main combustion at a timing later than a start timing of the normal combustion in the normal combustion mode, after an end of the preliminary combustion, to generate the output torque of the engine, and recirculating exhaust gas to the combustion chamber at the second EGR rate.

According to another aspect of the invention, a method of controlling combustion for an internal combustion engine including an exhaust purifier, the method comprises switching a combustion mode between a normal combustion mode and a split retard combustion mode, in accordance with an condition of the exhaust purifier, determining a first EGR rate for the normal combustion mode and a second EGR rate lower than the first EGR rate for the split retard combustion mode, in accordance with an operating point of the engine, performing the following in the normal combustion mode, producing normal combustion to generate an output torque of the engine, and recirculating exhaust gas to the combustion chamber at the first EGR rate, and performing the following in the split retard combustion mode, producing preliminary combustion at or near top dead center, to release a predetermined quantity of heat in the combustion chamber, starting main combustion at a timing later than a start timing of the normal combustion in the normal combustion mode, after an end of the preliminary combustion, to generate the output torque of the engine, and recirculating exhaust gas to the combustion chamber at the second EGR rate.

The above objects and other objects, features, and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

FIG. 4A is a time chart of a fuel injection quantity in a normal combustion mode.

FIG. 4B is a time chart of a heat release rate in accordance with the fuel injection shown in FIG. 4A.

FIG. 5A is a time chart of the fuel injection quantity in a split retard combustion mode.

FIG. 5B is a time chart of the heat release rate in accordance with the fuel injection shown in FIG. 5A.

FIG. 7A is a time chart of the fuel injection quantity in the split retard combustion mode under a low load condition.

FIG. 7B is a time chart of the heat release rate in accordance with the fuel injection shown in FIG. 7A.

DETAILED DESCRIPTION OF THE INVENTION

Figure 1:
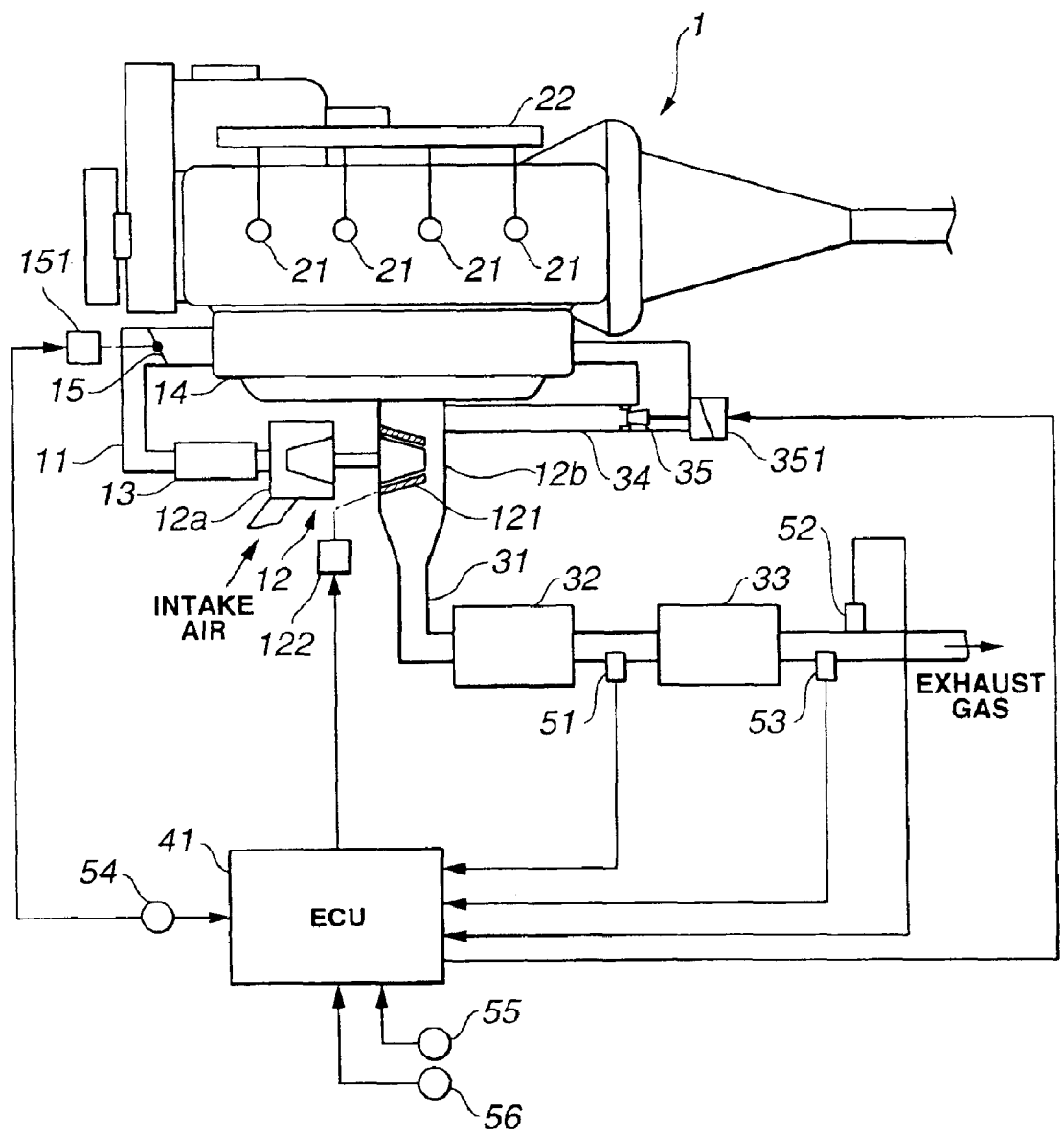
FIG. 1 is a schematic diagram depicting a diesel engine including a combustion control apparatus in accordance with an embodiment of the present invention.

Referring now to FIG. 1, there is shown a diesel engine including a combustion control apparatus in accordance with an embodiment of the present invention. Intake air flows through an air cleaner (not shown) disposed at the inlet of an intake air passage 11. The air cleaner removes dust articles from intake air. In intake air passage 11 is disposed a compressor 12a of a variable nozzle turbocharger 12, which compresses intake air. Downstream from compressor 12a is disposed an intercooler 13, which cools the compressed intake air. After cooled, intake air flows into a serge tank 14. Serge tank 14 includes a manifold section for distributing intake air to cylinders. Upstream to serge tank 14 is disposed a throttle valve 15, which varies the airflow quantity of intake air. Throttle valve 15A is connected to a throttle actuator 151 for regulating the opening thereof.

In the cylinder head of engine 1 is disposed a fuel injector 21 in each cylinder. Discharged from a fuel pump (not shown), fuel is supplied to fuel injector 21 via a common rail 22. Fuel injector 21 injects fuel directly into each combustion chamber. Fuel injector 21 is capable of injecting fuel in multiple timings in one stroke. Engine 1 is normally operated in a normal combustion mode in a normal operating mode. In the normal combustion mode, fuel injector 21 performs a main fuel injection for producing engine output torque and a pilot fuel injection prior to the main fuel injection.

Exhaust gas flows in an exhaust gas passage 31. Downstream from an exhaust manifold is disposed a turbine 12b of turbocharger 12. Turbine 12b rotates compressor 12a, driven by exhaust gas. Turbine 12b includes a movable vane 121. Movable vane 121 is connected to a vane actuator 122 for regulating the angle thereof. Downstream from turbine 12b is disposed a NOx trap 32, downstream from which is disposed a particulate filter such as a diesel particulate filter (DPF) 33. NOx trap 32 has different functions in accordance with an exhaust air-fuel ratio. That is, NOx trap 32 removes from exhaust gas and traps NOx during the exhaust air-fuel ratio being low or exhaust gas being lean in fuel. On the other hand, NOx trap 32 releases NOx during the exhaust air-fuel ratio being high or exhaust gas being rich in fuel. NOx released from NOx trap 32 is purified by a reducing agent such as hydrocarbon (HC) in exhaust gas. In addition to NOx, NOx trap 32 removes from exhaust gas and traps sulfur content (S). NOx trap 32 has a function of oxidizing HC and carbon monoxide (CO), in addition to the function of purifying NOx. DPF 33 includes a porous filter element as formed of ceramic. The filter element of DPF 33 filters exhaust gas to remove exhaust particulate matter. NOx trap 32 and DPF 33 serves for an exhaust purifier to trap substances in exhaust gas.

Between intake air passage 11 and exhaust gas passage 31 is disposed an EGR pipe 34. Within EGR pipe 34 is disposed an EGR valve 35. EGR valve 35 is connected to an EGR actuator 351 to regulate the opening of EGR valve 35. In exhaust gas passage 31, a pressure sensor 51 is disposed between NOx trap 32 and DPF 33, for sensing an exhaust gas pressure Pexh of exhaust gas. Downstream from DPF 33 are disposed an oxygen sensor 52 and a temperature sensor 53. Oxygen sensor 52 senses an excess air ratio λ. Temperature sensor 53 senses an exhaust gas temperature. The detected exhaust gas temperature is used for estimating a bed temperature of NOx trap 32 (NOx trap temperature) Tnox and a bed temperature of DPF 33 (DPF temperature) Tdpf. NOx trap temperature Tnox and DPF temperature Tdpf may be sensed directly by temperature sensors disposed at NOx trap 32 and DPF 33. The engine system includes an air flow meter 54, a crank angle sensor 55, and an accelerator opening sensor 56. The sensors as a condition sensor collects information needed to determine the operating condition of the engine, and outputs signals to a controller such as an electric control unit (ECU) 41. ECU 41 determines or calculates an intake air quantity Qac, an engine speed Ne, and an accelerator opening APO, based on the signals from air flow meter 54, crank angle sensor 55, and accelerator opening sensor 56, respectively. ECU 41 executes a routine including the above-discussed calculation, and issues commands to a combustion controlling actuator including fuel injector 21, vane actuator 122, throttle actuator 151, and EGR actuator 351.

Figure 2:
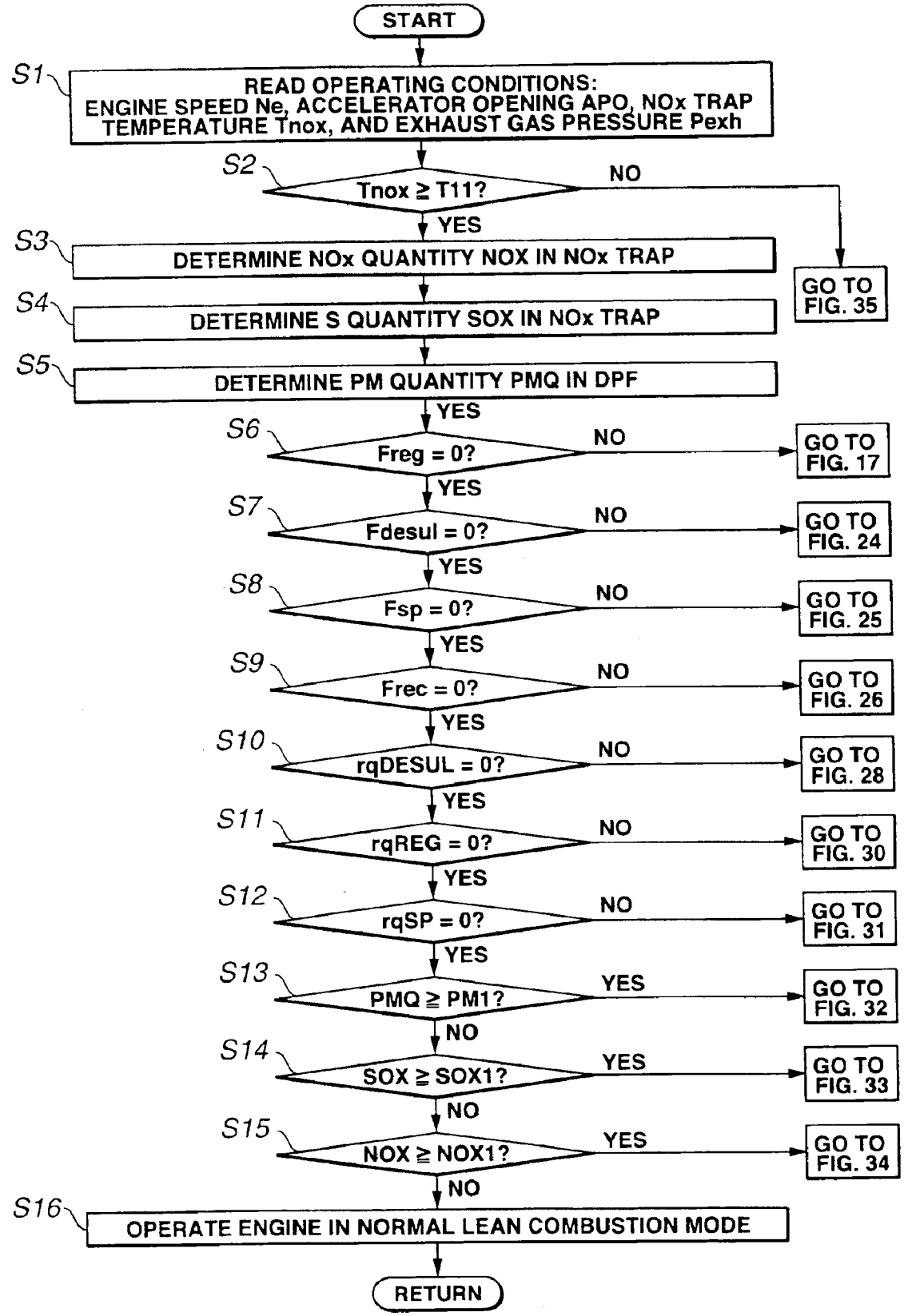
FIG. 2 is a flow chart depicting a process of determining an operating mode of the engine in accordance with the embodiment of the present invention.

The following describes operations of ECU 41. PM regeneration indicates an operation to release PM from DPF.33. NOx regeneration indicates an operation to release NOx from NOx trap 32. S regeneration indicates an operation to release sulfur content from NOx trap 32. Referring now to FIG. 2, there is shown a flow chart depicting a process of determining an operating mode of the engine in accordance with the embodiment of the present invention. ECU 41 switches the combustion mode in accordance with the operating mode.

At step S1, ECU 41 reads engine speed Ne, accelerator opening APO, NOx trap temperature Tnox, and exhaust gas pressure Pexh.

At step S2, a check is made to determine whether NOx trap 32 is activated or not. Actually, it is determined whether or not NOx trap temperature Tnox is higher than or equal to a predetermined threshold temperature T11. When the answer to step S2 is YES, the routine proceeds to step S3. On the other hand, when the answer to step S2 is NO, the routine proceeds to a routine shown in FIG. 35. Temperature T11 is an activation temperature at which NOx trap 32 is activated.

At step S3, ECU 41 determines a trapped quantity of NOx (NOx quantity NOX). NOx quantity NOX, which is a quantity of NOx trapped in NOx trap 32, is calculated based on engine speed Ne from the following equation (1).

$$NOX = NOX_{n-1} + Ne \cdot \Delta t \qquad (1)$$

where a variable including a numerical subscript n−1 indicates a value calculated in the preceding execution, $\Delta t$ indicates a time interval of a series of execution of the routine. Alternatively, NOx quantity NOX may be estimated by adding up a predetermined quantity for each predetermined distance traveled.

At step S4, ECU 41 determines a trapped quantity of S (S quantity SOX). S quantity SOX, which is a quantity of NOx trapped in NOx trap 32, is calculated based on engine speed Ne from the following equation (2), as in the case of NOx quantity NOX.

$$SOX = SOX_{n-1} + Ne \cdot \Delta t \qquad (2)$$

At step S5, ECU 41 determines a particulate matter (PM) accumulation quantity PMQ. PM quantity PMQ, which is a quantity of PM accumulated in DPF 33, is estimated based on exhaust gas pressure Pexh upstream to DPF 33. Alternatively, PM quantity PMQ may be estimated by calculating and adding up a PM quantity per unit time, based on engine speed Ne and/or a traveled distance.

At step S6, a check is made to determine whether or not a PM regeneration flag Freg is equal to zero. PM regeneration flag Freg is reset to zero during the normal operating mode. When the answer to step S6 is YES, the routine proceeds to step S7. On the other hand, when the answer to step S6 is NO, the routine proceeds to a routine shown in FIG. 17.

Figure 24:
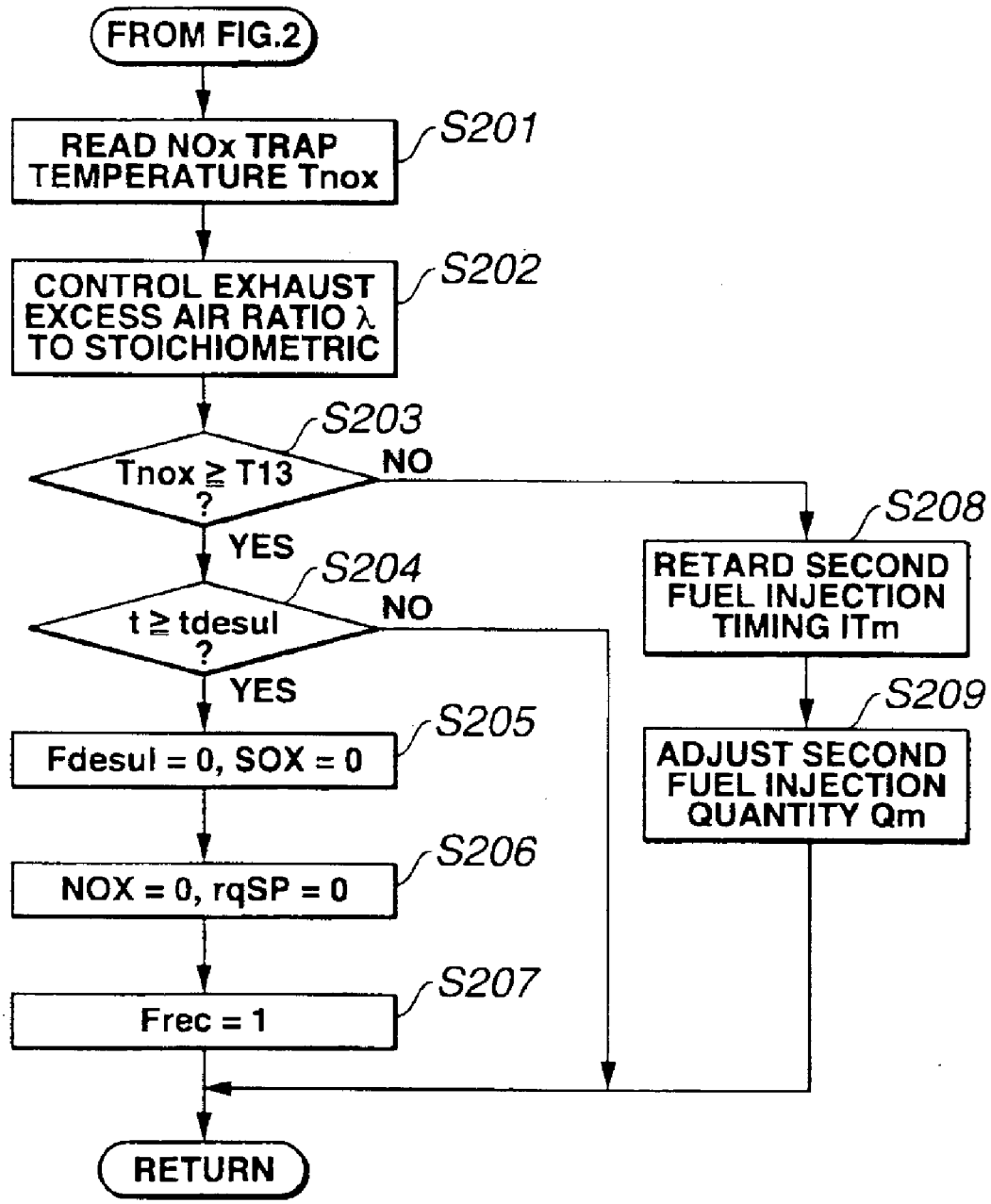
FIG. 24 is a flow chart depicting a process of S regeneration in accordance with the embodiment of the present invention.

At step S7, a check is made to determine whether or not an S regeneration flag Fdesul is equal to zero. S regeneration flag Fdesul is reset to zero during the normal operating mode. When the answer to step S7 is YES, the routine proceeds to step S8. On the other hand, when the answer to step S7 is NO, the routine proceeds to a routine shown in FIG. 24.

At step S8, a check is made to determine whether or not a NOx regeneration flag Fsp is equal to zero. NOx regeneration flag Fsp is reset to zero during the normal operating mode. When the answer to step S8 is YES, the routine proceeds to step S9. On the other hand, when the answer to step S8 is NO, the routine proceeds to a routine shown in FIG. 25.

At step S9, a check is made to determine whether or not a breakdown avoidance flag Frec is equal to zero. Breakdown avoidance flag Frec is reset to zero during the normal operating mode, and temporarily set to 1 just after PM regeneration or S regeneration is discontinued. When the answer to step S9 is YES, the routine proceeds to step S10. On the other hand, when the answer to step S9 is NO, the routine proceeds to a routine shown in FIG. 26.

At step S10, a check is made to determine whether or not an S regeneration request flag rqDESUL is equal to zero. S regeneration request flag rqDESUL is reset to zero during the normal operating mode, and set to 1 when S regeneration is desired in accordance with S quantity SOX. When the answer to step S10 is YES, the routine proceeds to step S11.

Figure 28:
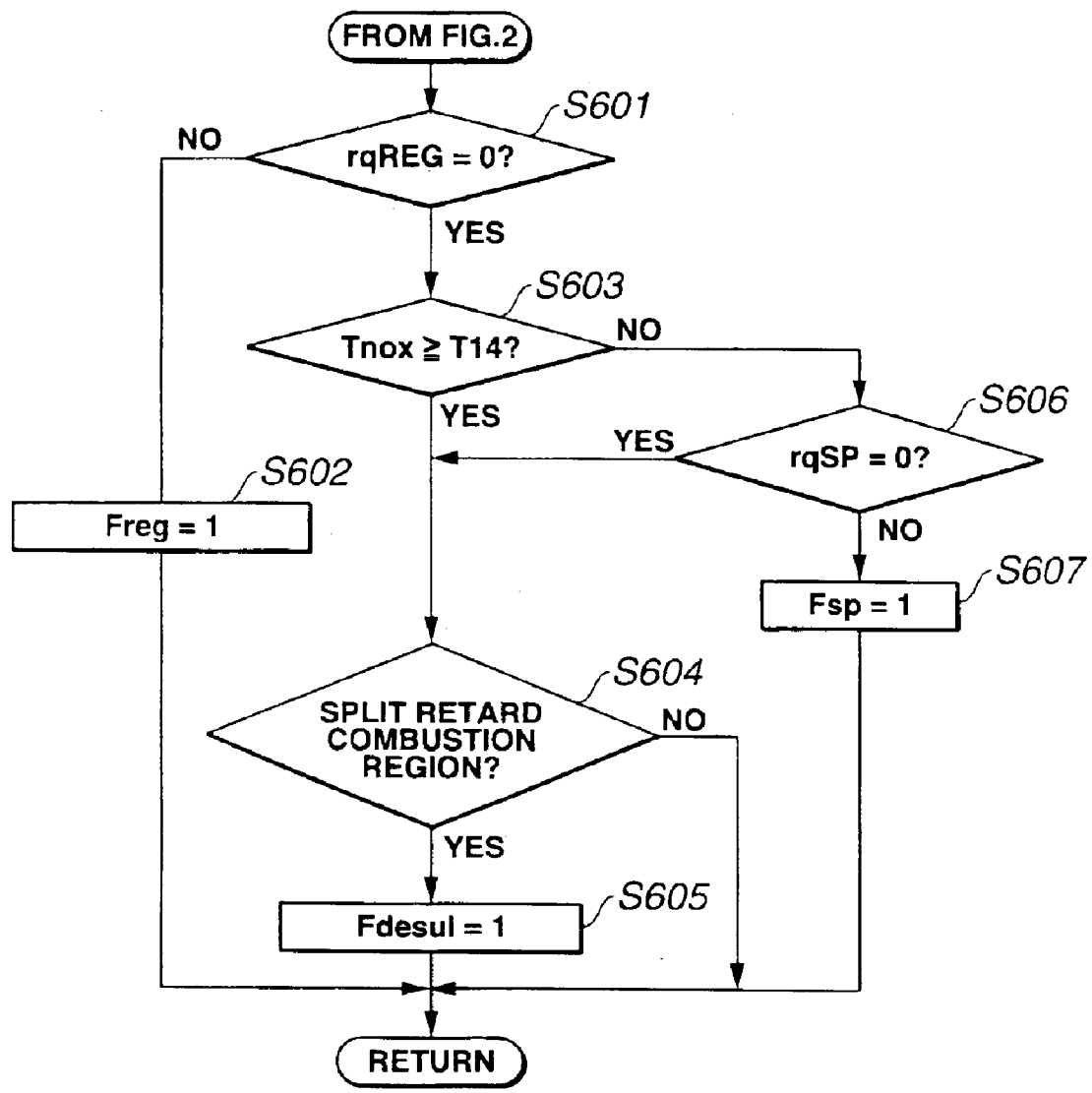
FIG. 28 is a flow chart depicting a first process of setting operating mode flags in accordance with the embodiment of the present invention.

On the other hand, when the answer to step S10 is NO, the routine proceeds to a routine shown in FIG. 28.

At step S11, a check is made to determine whether or not a PM regeneration request flag rqREG is equal to zero. PM regeneration request flag rqREG is reset to zero during the normal operating mode, and set to 1 when PM regeneration is desired in accordance with PM quantity PMQ. When the answer to step S11 is YES, the routine proceeds to step S12. On the other hand, when the answer to step S11 is NO, the routine proceeds to a routine shown in FIG. 30.

At step S12, a check is made to determine whether or not a PM regeneration request flag rqREG is equal to zero. PM regeneration request flag rqREG is reset to zero during the normal operating mode, and set to 1 when NOx regeneration is desired in accordance with NOx quantity NOX. When the answer to step S12 is YES, the routine proceeds to step S13. On the other hand, when the answer to step S12 is NO, the routine proceeds to a routine shown in FIG. 31. At step S701 in FIG. 31, NOx regeneration flag Fsp is set to 1.

Figure 3:
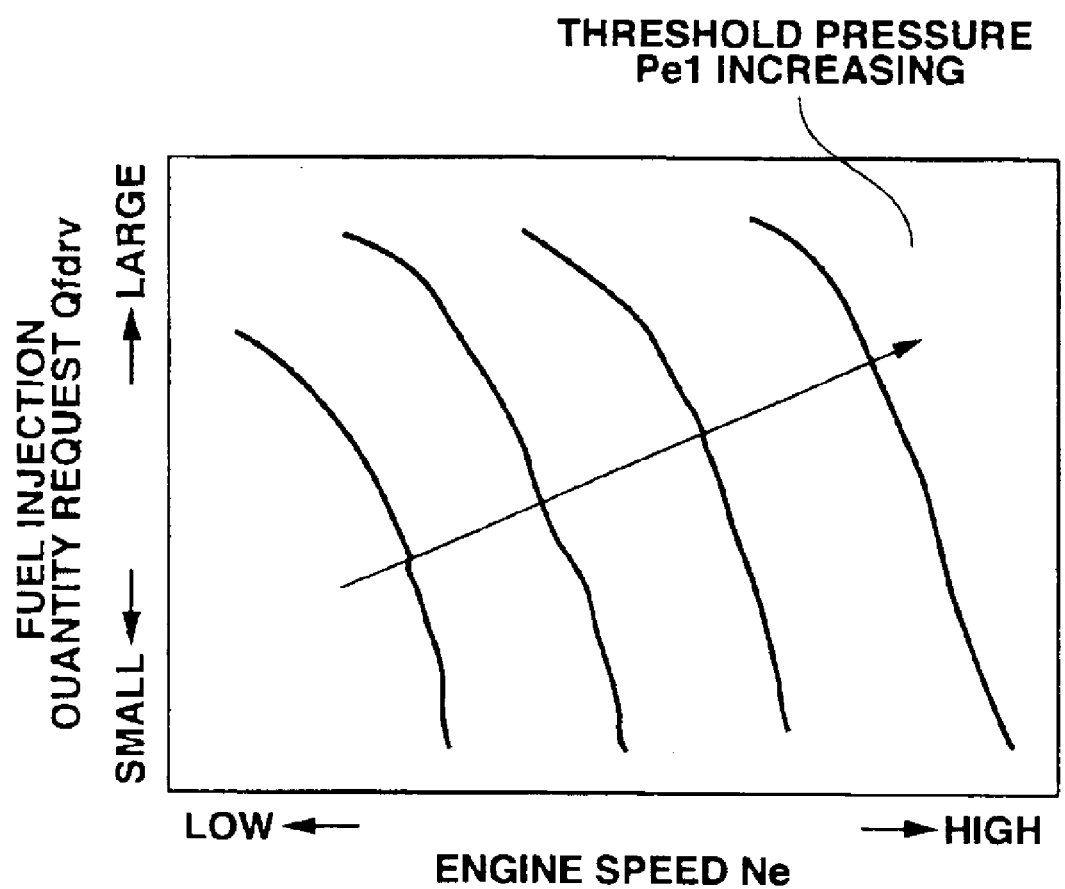
FIG. 3 is a representation of a map of a relationship among a threshold pressure Pe1 for determining the start of PM regeneration, an engine speed Ne, and a fuel injection quantity request Qfdrv.
Figure 32:
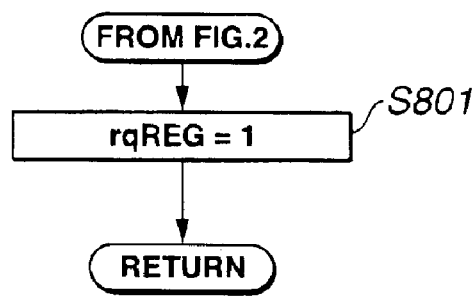
FIG. 32 is a flow chart depicting a process of setting a PM regeneration request flag rqREG in accordance with the embodiment of the present invention.

At step S13, a check is made to determine whether or not PM regeneration is desired. That is, it is determined whether or not PM quantity PMQ is larger than or equal to a predetermined threshold quantity PM1. An exhaust gas pressure Pe1 corresponding to threshold quantity PM1 is determined in accordance with the operating condition. Actually, exhaust gas pressure Pexh detected by pressure sensor 51 is compared with pressure Pe1. Pressure Pe1 is calculated or retrieved from a map as shown in FIG. 3 as a function of engine speed Ne and fuel injection quantity request Qfdrv. Threshold pressure Pe1 increases with increasing engine speed Ne and increasing fuel injection quantity request Qfdrv. Fuel injection quantity request Qfdrv indicates a fuel quantity supplied with main fuel injection in the normal combustion mode (main fuel injection quantity) Qmain, and indicates a fuel quantity supplied with second fuel injection in a split retard combustion mode (second fuel injection quantity) Qm, as below discussed. When the answer to step S13 is YES, the routine proceeds to a routine shown in FIG. 32. At step S801 in FIG. 32, PM regeneration request flag rqREG is set to 1. On the other hand, when the answer to step S13 is NO, the routine proceeds to step S14. Alternatively, the traveled distance after the last process of PM regeneration may be calculated for the determination of PM regeneration request flag rqREG. In this case, PM regeneration request flag rqREG is set to 1 when the traveled distance after the last process of PM regeneration reaches a predetermined distance. This prevents potential redundant execution of PM regeneration.

Figure 33:
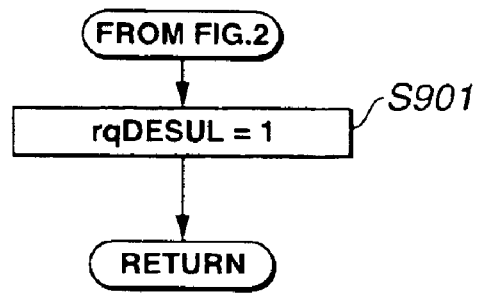
FIG. 33 is a flow chart depicting a process of setting an S regeneration request flag rqDESUL in accordance with the embodiment of the present invention.

At step S14, a check is made to determine whether or not S regeneration is desired. That is, it is determined whether or not S quantity SOX is larger than or equal to a predetermined threshold quantity SOX1. When the answer to step S14 is YES, the routine proceeds to a routine shown in FIG. 33. At step S901 in FIG. 33, S regeneration request flag rqDESUL is set to 1. On the other hand, when the answer to step S14 is NO, the routine proceeds to step S15.

Figure 34:
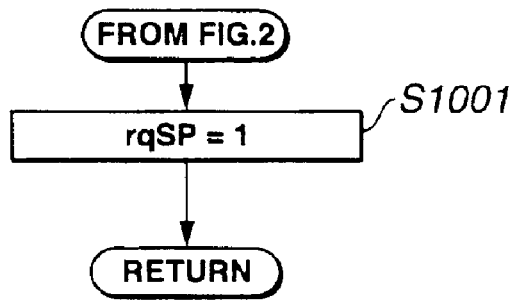
FIG. 34 is a flow chart depicting a process of setting a NOx regeneration request flag rqSP in accordance with the embodiment of the present invention.

At step S15, a check is made to determine whether or not NOx regeneration is desired. That is, it is determined whether or not NOx quantity NOX is larger than or equal to a predetermined threshold quantity NOX1. When the answer to step S15 is YES, the routine proceeds to a routine shown in FIG. 34. At step S1001 in FIG. 34, NOx regeneration request flag rqSP is set to 1. On the other hand, when the answer to step S15 is NO, the routine proceeds to step S16.

Regeneration request flags reREG, reDESUL, and reSP are each reset to zero, when engine 1 is turned on.

At step S16, ECU 41 operates engine 1 in the normal lean combustion mode (normal combustion mode). On the other hand, ECU 41 shifts the combustion mode to the split retard combustion mode, in case the routine proceeding from step S2 to the routine in FIG. 35 to activate NOx trap 32, in case the routine proceeding from step S6 to the routine in FIG. 17 to perform PM regeneration, in case the routine proceeding from step S7 to the routine in FIG. 24 to perform S regeneration, and in case the routine proceeding from step S8 to the routine in FIG. 25 to perform NOx regeneration.

The following describes the combustion modes in detail. Referring now to FIGS. 4A to 5B, there are shown a fuel injection pattern and a heat release rate in each combustion mode. FIGS. 4A and 4B show the normal combustion mode. FIGS. 5A and 5B show the split retard combustion mode. In the normal combustion mode, a pilot fuel injection and a main fuel injection are performed under a regular operating condition. The pilot fuel injection is executed between 40–10° CA before top dead center (BTDC). The fuel quantity per stroke is set to 1–3 mm$^3$. Following the pilot fuel injection, the main fuel injection is executed between 10° BTDC and 20° after top dead center (ATDC). The time interval between timings (start timings) of the pilot fuel injection and the main fuel injection is set between 10–30° CA.

As shown in FIGS. 5A and 5B, two fuel injections are employed in the split retard combustion mode. In the split retard combustion mode, a first fuel injection is executed in compression stroke, and a second fuel injection is executed in expansion stroke. The first fuel injection produces preliminary combustion at or near TDC to release heat quantity P, so as to raise an incylinder temperature at TDC of compression stroke (compression end temperature). The fuel quantity by the first fuel injection (first fuel injection quantity) Qp is determined so as to produce a recognizable heat release quantity. First fuel injection quantity Qp desired varies in accordance with the operating condition of the engine system. After an end of the preliminary combustion, the second fuel injection is executed so that main combustion produces engine output torque. The main combustion releases heat quantity M. A time interval Δtij between the start timing of first fuel injection (first fuel injection timing) ITp and the start timing of second fuel injection (second fuel injection timing) ITm is determined based on engine speed Ne, so that a time interval between the start timing of preliminary combustion and the start timing of main combustion is longer than or equal to 20° CA. Since the main combustion takes place in expansion stroke, the duration of the burning process of the main combustion is extended so that the end timing of the burning process is after 50° ATDC. The preliminary combustion or the heat release of the preliminary combustion starts an ignition lag Δtigp after the start of the first fuel injection. The main combustion or the heat release of the main combustion starts an ignition lag Δtigm after the start of the second fuel injection.

Figure 6A:
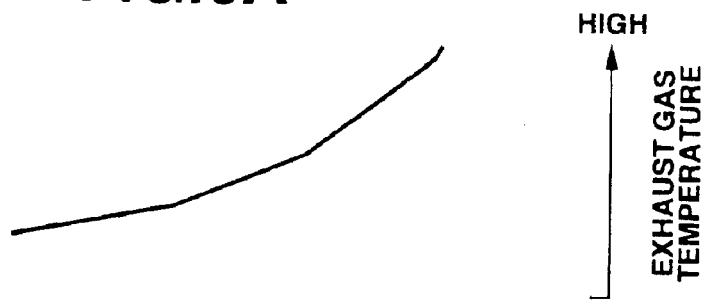
FIG. 6A is a representation of a table of a relationship between an exhaust gas temperature and a second fuel injection timing ITm in the split retard combustion mode.
Figure 6B:
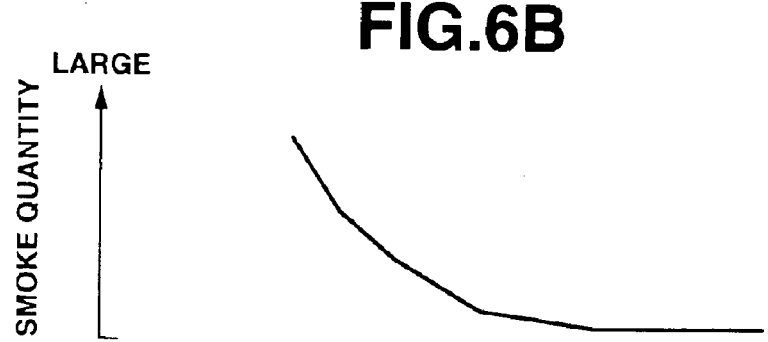
FIG. 6B is a representation of a table of a relationship between a smoke quantity and second fuel injection timing ITm in the split retard combustion mode.
Figure 6C:
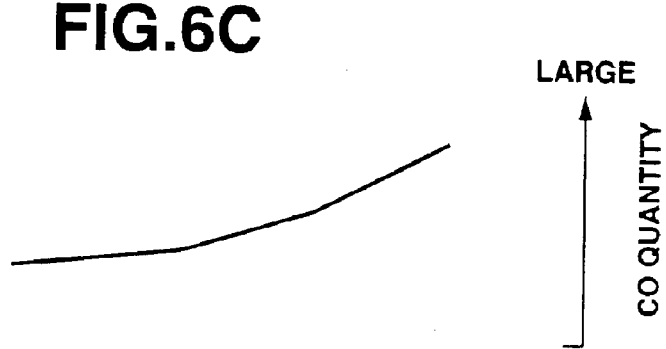
FIG. 6C is a representation of a table of a relationship between a CO quantity and second fuel injection timing ITm in the split retard combustion mode.
Figure 6D:
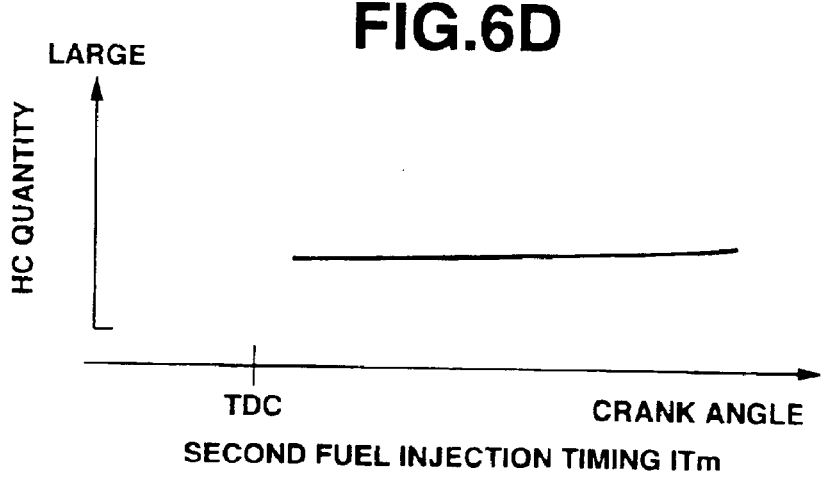
FIG. 6D is a representation of a table of a relationship between a HC quantity and second fuel injection timing ITm in the split retard combustion mode.

Referring now to FIGS. 6A through 6D, there are shown effects produced by the split retard combustion, with reference to second fuel injection timing ITm. Excess air ratio λ is held constant. In the split retard combustion mode, the exhaust gas temperature increases with retarding second fuel injection timing ITm, as shown in FIG. 6A. The time interval Δtij between first fuel injection timing ITp and second fuel injection timing ITm is adjusted to ensure the time interval between the end timing of the preliminary combustion and the start timing of the main combustion. Performing the second fuel injection after the end of the preliminary combustion ensures a time period longer than ignition lag Δtigm between the end timing of the preliminary combustion and the start timing of the main combustion. This increases the proportion of premixed combustion in the main combustion. During regenerating the exhaust purifier, for example, during PM regeneration for DPF 33, the exhaust gas temperature is raised to a high temperature desired for activating NOx trap 32, and excess air ratio λ is decreased without increasing exhaust smoke. As shown in FIGS. 6A and 6B, the exhaust gas temperature rises and the quantity of exhaust smoke decreases with retarding second fuel injection timing ITm. In general, the exhaust air-fuel ratio is reduced by decreasing the intake air quantity, which tends to produce an unstable process of combustion. However, in the shown embodiment, the preliminary combustion increases compression end temperature to allow a stable process of the main combustion. In the split retard combustion mode, the HC quantity remains below a low level, little depending on second fuel injection timing ITm.

Under low load conditions, the exhaust gas temperature is inherently low. Accordingly, it is necessary to raise the exhaust gas temperature greatly for obtaining a target temperature for PM regeneration or S regeneration. For raising the exhaust gas temperature, a main combustion timing (start timing of the main combustion) needs to be retarded more than in the normal split retard combustion mode. However, there is a possibility that a single process of the preliminary combustion is not enough to maintain the incylinder temperature above a desirable level for the main combustion. In such a case, in the split retard combustion mode, the preliminary combustion employs multiple burning processes, as shown in FIGS. 7A and 7B. The incylinder temperature is raised by the first process of preliminary combustion, and is maintained by the following process. Heat release P1, P2, and M are separated with no lap, to regulate the exhaust gas temperature to a target temperature without increasing exhaust smoke.

Figure 8:
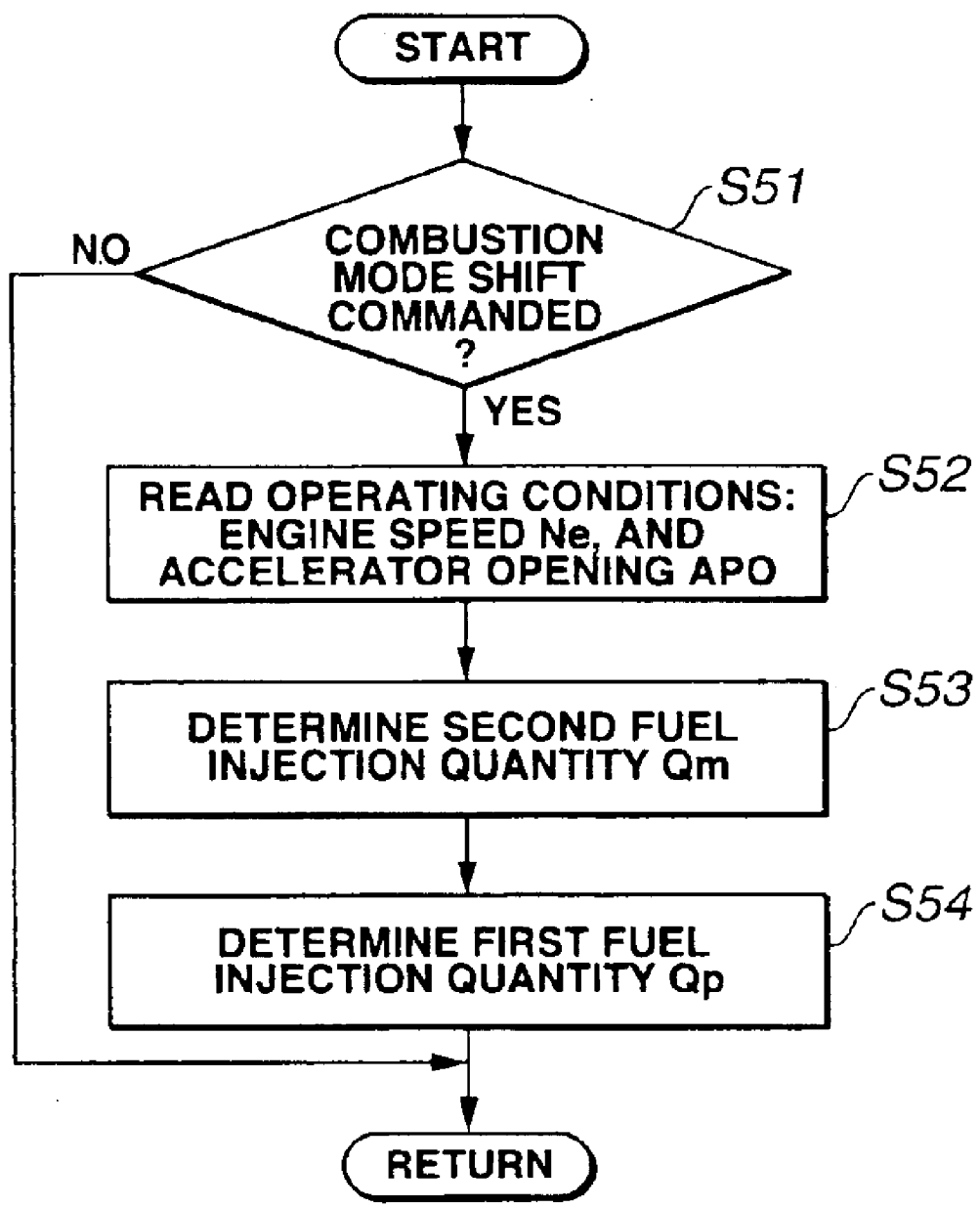
FIG. 8 is a flow chart depicting a process of determining fuel injection quantities for the split retard combustion mode in accordance with the embodiment of the present invention.

Referring now to FIG. 8, there is shown a flow chart depicting a process of determining fuel injection quantities for the split retard combustion mode. This routine is executed at the occasion of executing the split retard combustion. Actually, first fuel injection quantity Qp and fuel quantity by second fuel injection (second fuel injection quantity) Qm are determined.

At step S51, a check is made to determine whether or not combustion mode shift is commanded. ECU 41 issues the command of shifting the combustion mode in cases of activating NOx trap 32, PM regeneration, S regeneration, and NOx regeneration. When the answer to step S51 is YES, the routine proceeds to step S52. On the other hand, when the answer to step S51 is NO, the routine returns.

At step S52, ECU 41 reads engine speed Ne and accelerator opening APO. Next, the routine proceeds to step S53.

Figure 9:
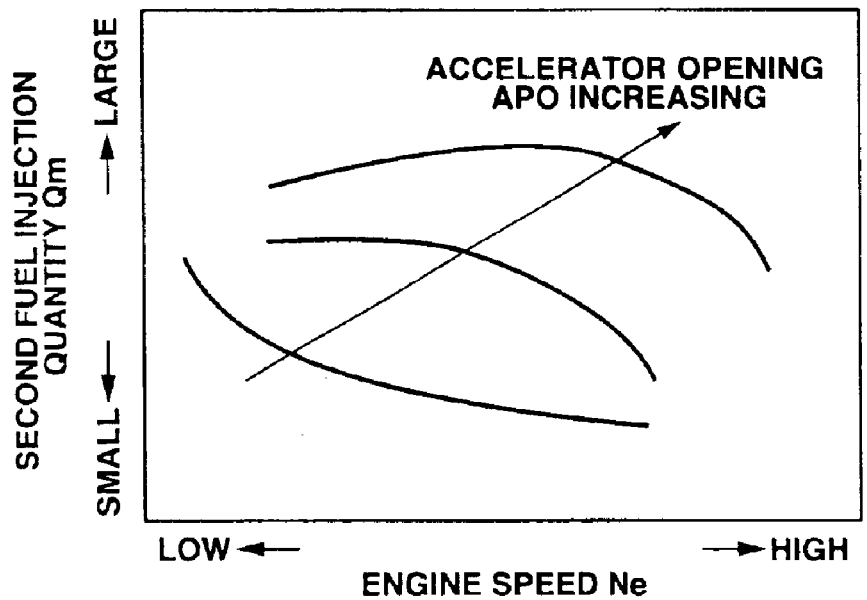
FIG. 9 is a representation of a map of a relationship among an accelerator opening APO, engine speed Ne, and a second fuel injection quantity Qm.

At step S53, ECU 41 determines second fuel injection quantity Qm. Second fuel injection quantity Qm is calculated or retrieved from a map as shown in FIG. 9 as a function of engine speed Ne and accelerator opening APO. With engine speed Ne held constant, second fuel injection quantity Qm increases with increasing accelerator opening APO.

Figure 10:
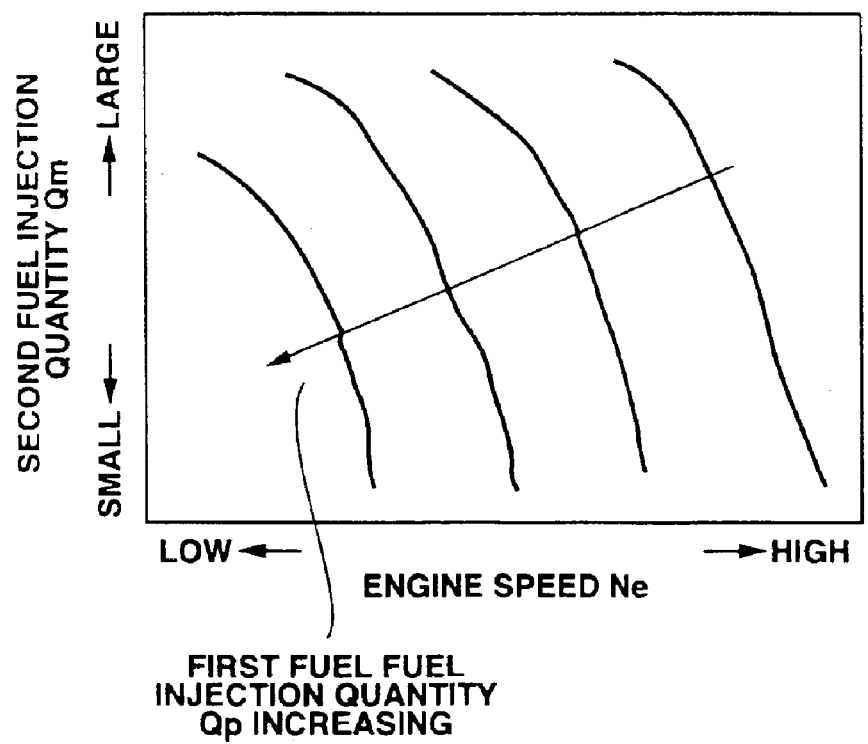
FIG. 10 is a representation of a map of a relationship among a first fuel injection quantity Qp, engine speed Ne, and second fuel injection quantity Qm.

At step S54, ECU 41 determines first fuel injection quantity Qp. First fuel injection quantity Qp is calculated or retrieved from a map as shown in FIG. 10 as a function of engine speed Ne and second fuel injection quantity Qm. First fuel injection quantity Qp increases with decreasing engine speed Ne and decreasing second fuel injection quantity Qm.

Figure 11:
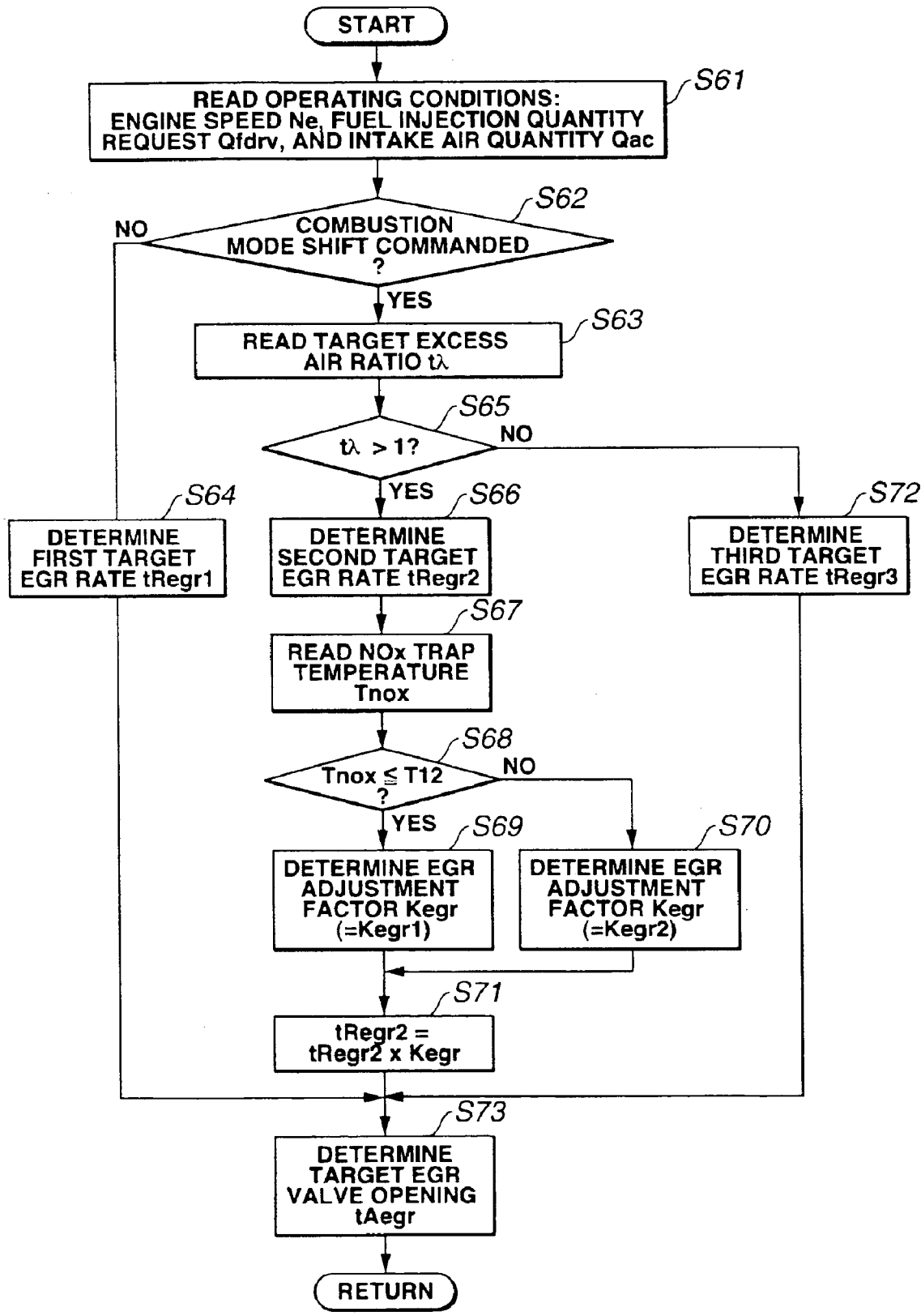
FIG. 11 is a flow chart depicting a process of controlling an EGR operation in accordance with the embodiment of the present invention.

Referring now to FIG. 11, there is shown a flow chart depicting a process of controlling an EGR operation. In the shown embodiment, an EGR rate indicates a rate of a quantity of recirculating exhaust gas to a total quantity of working gas.

At step S61, ECU 41 reads engine speed Ne and fuel injection quantity request Qfdrv, as an operating point, and reads intake air quantity Qac. Next, the routine proceeds to step S62.

At step S62, a check is made to determine whether or not combustion mode shift is commanded. When the answer to step S62 is YES, the routine proceeds to step S63. On the other hand, when the answer to step S62 is NO, the routine proceeds to step S64.

Figure 12:
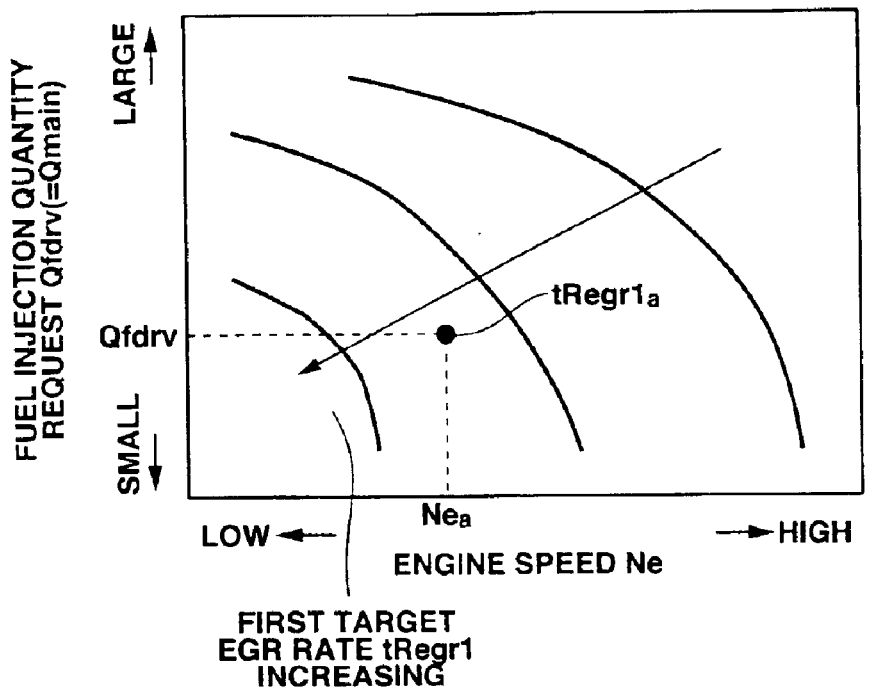
FIG. 12 is a representation of a map of a relationship among a first target EGR rate tRegr1, engine speed Ne, and fuel injection quantity request Qfdrv.

At step S64, ECU 41 determines a first target EGR rate tRegr1. First target EGR rate tRegr1 is calculated or retrieved from a map as shown in FIG. 12 as a function of engine speed Ne and fuel injection quantity request Qfdrv (=Qmain). First target EGR rate tRegr1 increases with decreasing engine speed Ne and decreasing fuel injection quantity request Qfdrv. Next, the routine proceeds to step S73.

At step S63, ECU 41 reads target excess air ratio tλ. Target excess air ratio tλ is set to a suitable value for each of PM regeneration, S regeneration, NOx regeneration, and rapid activation of the exhaust purifier. Actually, in the processes other than the rapid activation, target excess air ratio tλ is set to a value lower than in the normal combustion. Next, the routine proceeds to step S65.

At step S65, a check is made to determine whether or not target excess air ratio tλ is higher than 1. When the answer to step S65 is YES, the routine proceeds to step S66. On the other hand, when the answer to step S65 is NO, the routine proceeds to step S72.

Figure 13:
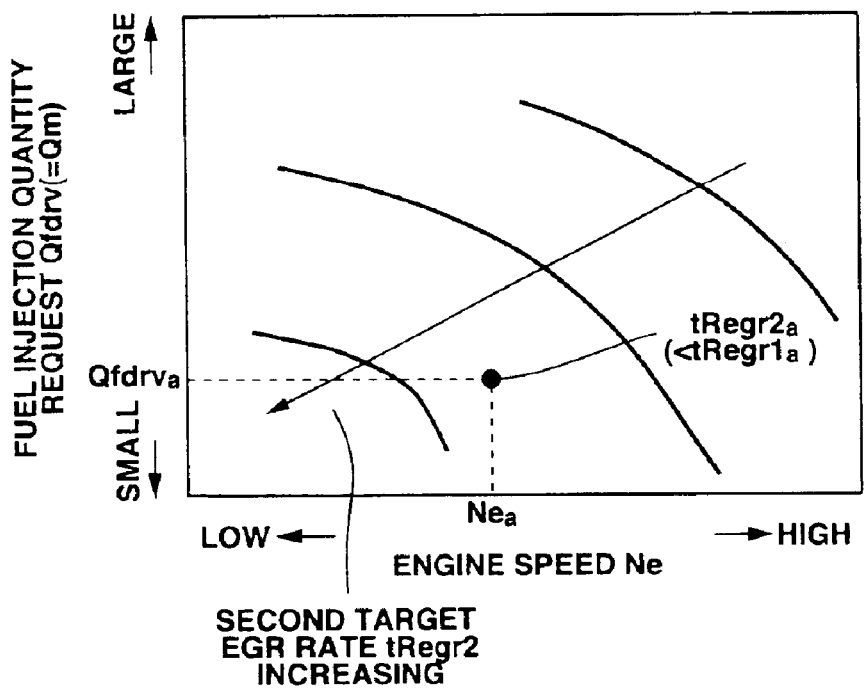
FIG. 13 is a representation of a map of a relationship among a second target EGR rate tRegr2, engine speed Ne, and fuel injection quantity request Qfdrv.

At step S66, ECU 41 determines a second target EGR rate tRegr2. Second target EGR rate tRegr2 is calculated or retrieved from a map as shown in FIG. 13 as a function of engine speed Ne and fuel injection quantity request Qfdrv. Second target EGR rate tRegr2 increases with decreasing engine speed Ne and decreasing fuel injection quantity request Qfdrv. Second target EGR rate tRegr2 is set to a value lower than first target EGR rate tRegr1, for any operating point, that is, for any combination of engine speed Ne and fuel injection quantity request Qfdrv. For example, second target EGR rate $tRegr2_a$ for engine speed $Ne_a$ and fuel injection quantity request $Qfdrv_a$ is set to 0.1, while first target EGR rate $tRegr1_a$ for engine speed $Ne_a$ and fuel injection quantity request $Qfdrv_a$ is set to 0.5. Next, the routine proceeds to step S67.

At step S67, ECU 41 reads NOx trap temperature Tnox. Next, the routine proceeds to step S68.

At step S68, a check is made to determine whether or not NOx trap temperature Tnox is lower than a predetermined temperature T12. In general, increasing NOx trap temperature Tnox degrades the function of NOx trap 32. Accordingly, temperature T12 is set to an upper limit of NOx trap temperature Tnox, at which NOx trap 32 normally functions. When the answer to step S68 is YES, the routine proceeds to step S69. On the other hand, when the answer to step S68 is NO, the routine proceeds to step S70.

Figure 14:
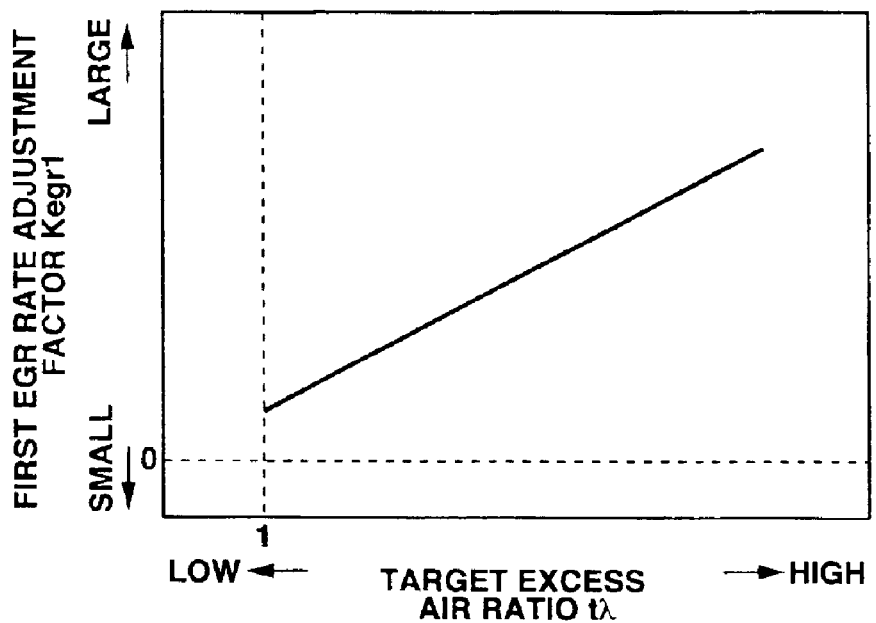
FIG. 14 is a representation of a table of a relationship between a first EGR rate adjustment factor Kegr1 and a target excess air ratio $t\lambda$ in accordance with the embodiment of the present invention.

At step S69, ECU 41 determines a first EGR rate adjustment factor Kegr1 as an EGR rate adjustment factor Kegr. First EGR rate adjustment factor Kegr1 is calculated or retrieved from a table as shown in FIG. 14 as a function of target excess air ratio tλ. First EGR rate adjustment factor Kegr1 increases with increasing target excess air ratio tλ. Next, the routine proceeds to step S71.

Figure 15:
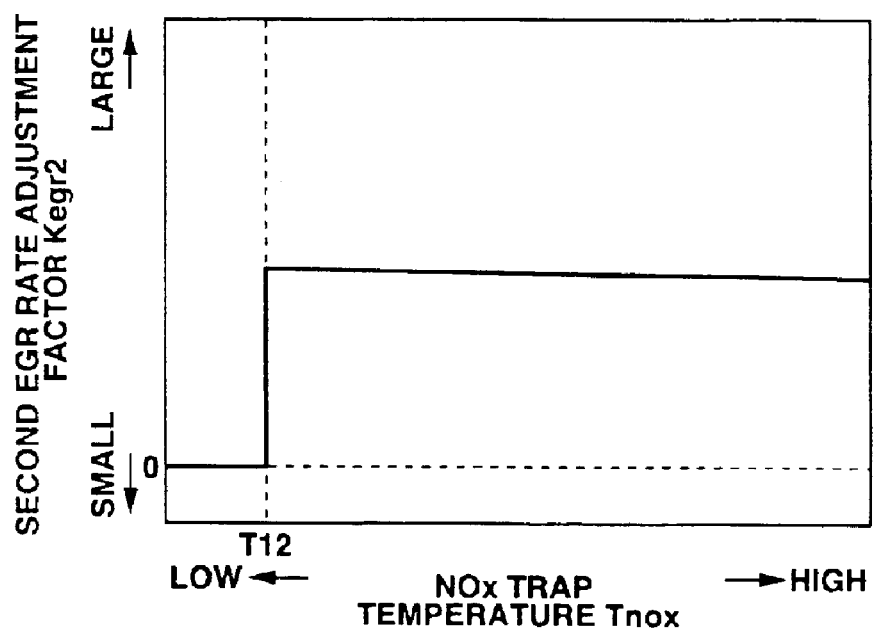
FIG. 15 is a representation of a table of a relationship between a second EGR rate adjustment factor Kegr2 and a NOx trap temperature Tnox in accordance with the embodiment of the present invention.

At step S70, ECU 41 determines a second EGR rate adjustment factor Kegr2 as an EGR rate adjustment factor Kegr. Second EGR rate adjustment factor Kegr2 is calculated or retrieved from a table as shown in FIG. 15 as a function of NOx trap temperature Tnox. Second EGR rate adjustment factor Kegr2 is set to a value greater than 1 with NOx trap temperature Tnox higher than temperature T12. In the shown embodiment, second EGR rate adjustment factor Kegr2 is held constant with varying NOx trap temperature Tnox. Alternatively, second EGR rate adjustment factor Kegr2 may be increased with increasing NOx trap temperature Tnox, to adjust the EGR rate in accordance with the degree of degradation of the trap function of NOx trap 32. Next, the routine proceeds to step S71.

At step S71, second target EGR rate tRegr2 determined through step S66 is multiplied by EGR rate adjustment factor Kegr to produce an adjusted second target EGR rate tRegr2. Adjusted with EGR rate adjustment factor Kegr, second target EGR rate tRegr2 is decreased with decreasing excess air ratio λ, during the function of NOx trap 32 being available. On the other hand, second target EGR rate tRegr2 is increased more than second target EGR rate tRegr2 initially retrieved, during the function of NOx trap 32 being degraded. In this manner, NOx quantity in exhaust gas is reduced by increasing the EGR rate, to prevent an increase of the pollutants in the exhaust gas emitted to the atmosphere. Next, the routine proceeds to step S73

Figure 16:
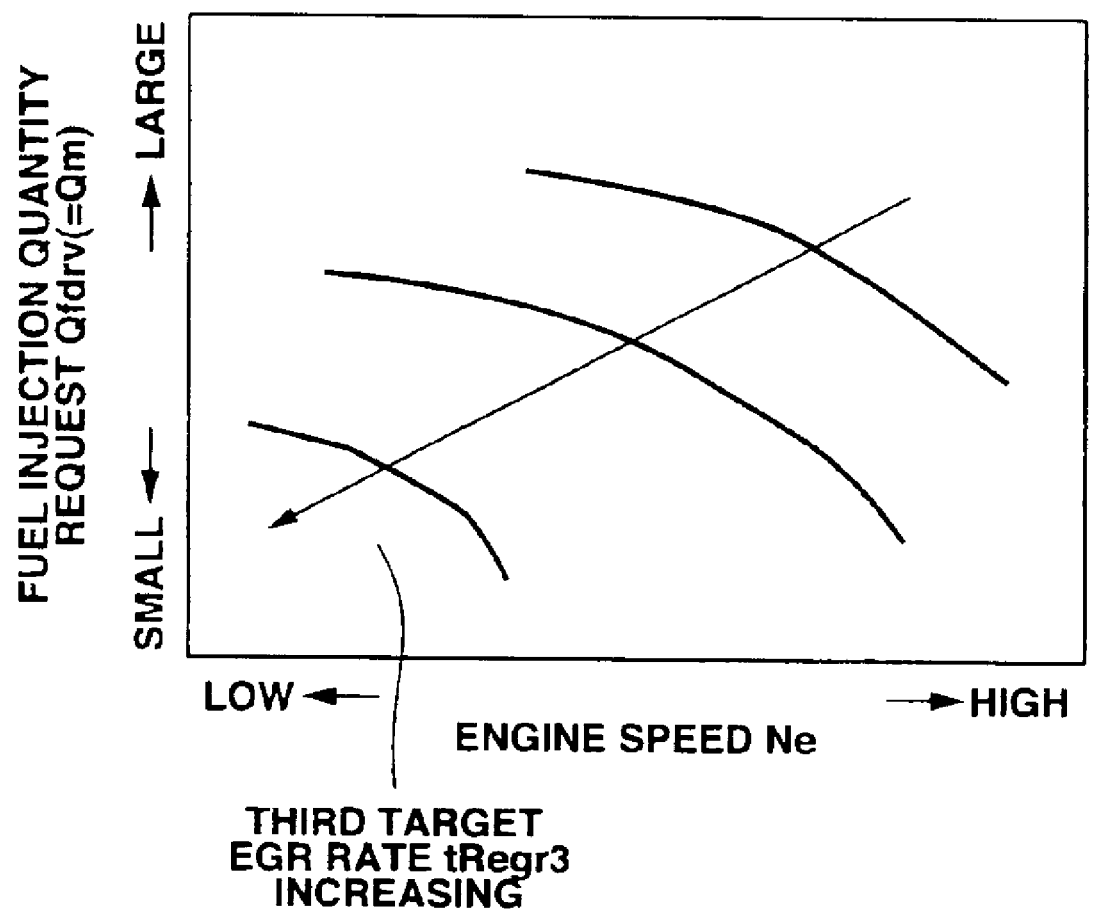
FIG. 16 is a representation of a map of a relationship among a third target EGR rate tRegr3, engine speed Ne, and fuel injection quantity request Qfdrv.

At step S72, ECU 41 determines a third target EGR rate tRegr3 as an EGR rate adjustment factor Kegr. Third target EGR rate tRegr3 is calculated or retrieved from a map as shown in FIG. 16 as a function of engine speed Ne and fuel injection quantity request Qfdrv. Third target EGR rate tRegr3 increases with decreasing engine speed Ne and decreasing fuel injection quantity request Qfdrv. In the shown embodiment, the quantity of intake air is decreased to decrease exhaust air-fuel ratio. Recirculating a proper quantity of exhaust gas results in an adequate quantity of working gas, to reduce an increase in pumping loss. HC, and CO, which is emitted in the combustion mode where excess air ratio λ is lower than 1, are purified by the oxygenizing function of NOx trap 32. Next, the routine proceeds to step S73

At step S73, ECU 41 determines a target EGR valve opening tAegr. First, a target EGR quantity tQegr is calculated as a function of target EGR rate tRegr (tRegr1, tRegr2, or tRegr3) and intake air quantity Qac, using the following equation (3).

$$tQegr = \{tRegr/(1-tRegr)\} \times tQac \quad (3)$$

Target EGR valve opening tAegr is determined in accordance with target EGR quantity tQegr. ECU 41 controls EGR actuator 351 to regulate EGR valve 35 to target EGR valve opening taegr. Next, the routine returns.

Figure 17:
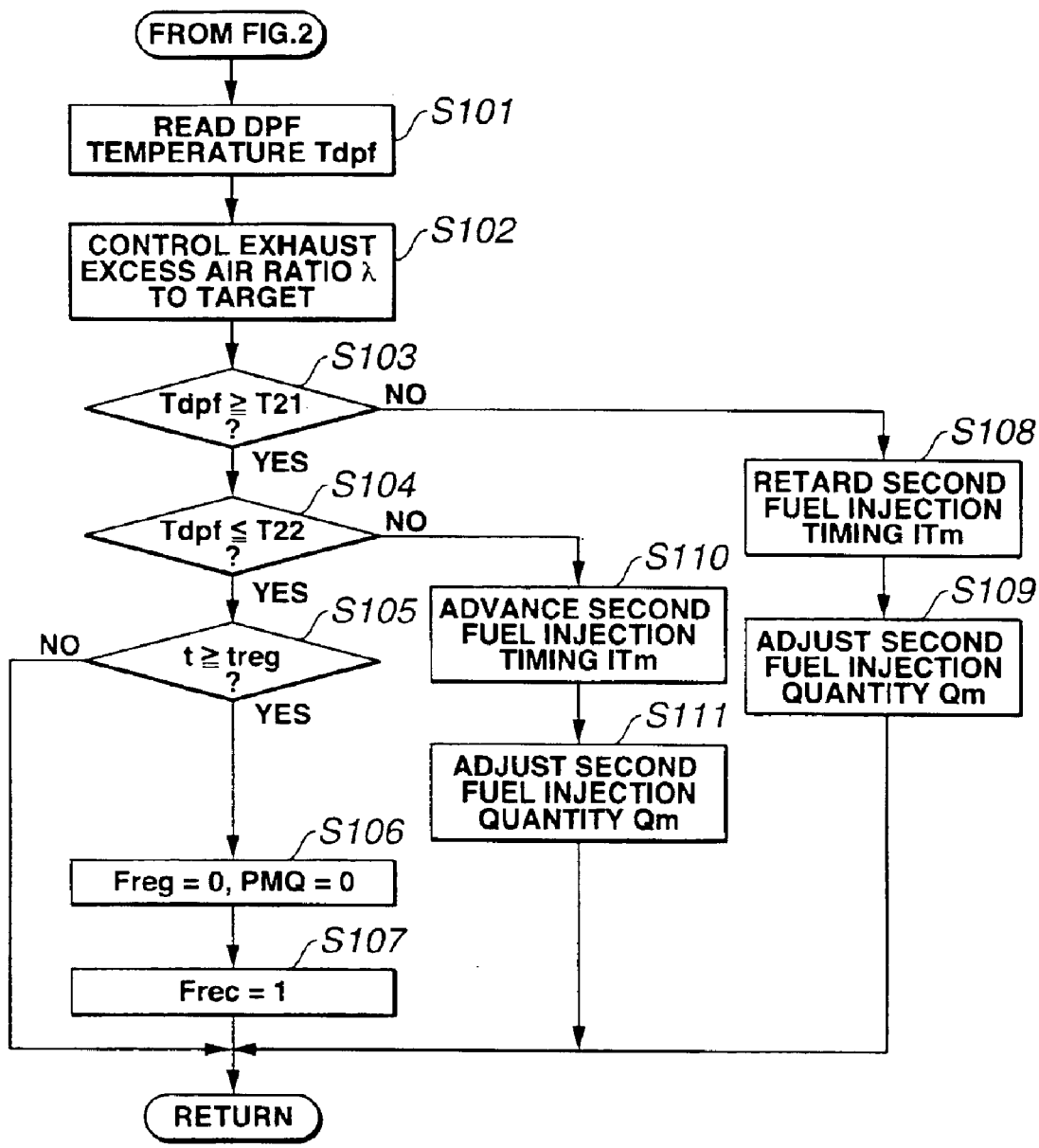
FIG. 17 is a flow chart depicting a process of controlling the exhaust gas temperature in the process of PM regeneration shown in FIG. 11.

Referring now to FIG. 17, there is shown a flow chart of a process of PM regeneration. This routine is executed when the answer to step S6 in FIG.2 is NO, that is, when PM regeneration flag Freg is set to 1. PM regeneration is implemented by raising the exhaust gas temperature to burn particulate matter in DPF 33. Accordingly, the engine system is operated in the split retard combustion mode. Second fuel injection timing ITm is controlled to raise the exhaust gas temperature and to raise DPF temperature up to a temperature at which PM is burned, such as 600° C. in the shown embodiment. This routine determines first fuel injection timing ITp and second fuel injection timing ITm.

At step S101 in FIG. 12, ECU 41 reads DPF temperature Tdpf. Next, the routine proceeds to step S102.

Figure 18:
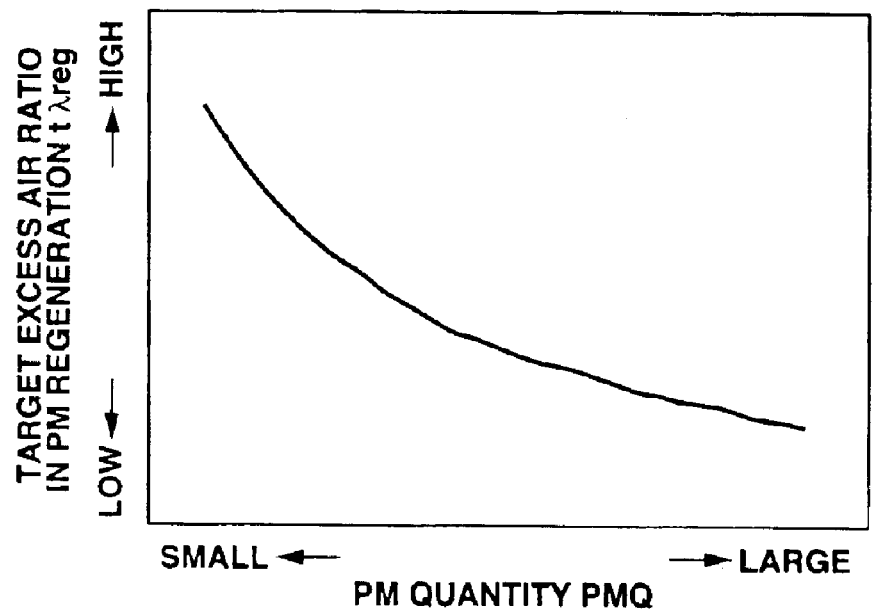
FIG. 18 is a representation of a table of a relationship between a PM quantity PMQ and a target excess air ratio in PM regeneration $t\lambda$reg in accordance with the embodiment of the present invention.
Figure 19:
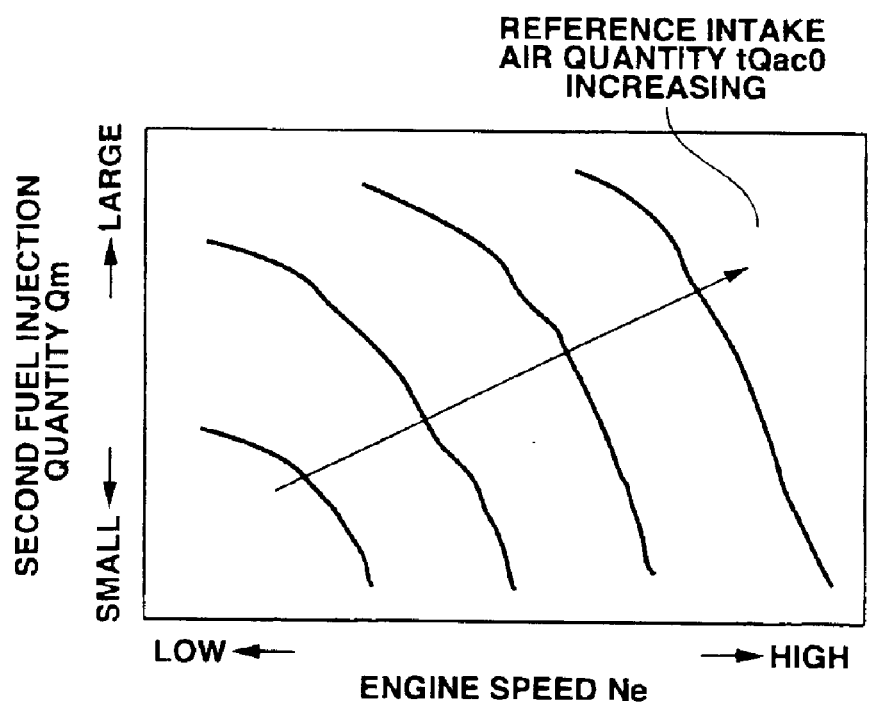
FIG. 19 is a representation of a map of a relationship among a reference intake air quantity tQac0, engine speed Ne, and second fuel injection quantity Qm in accordance with the embodiment of the present invention.
Figure 20:
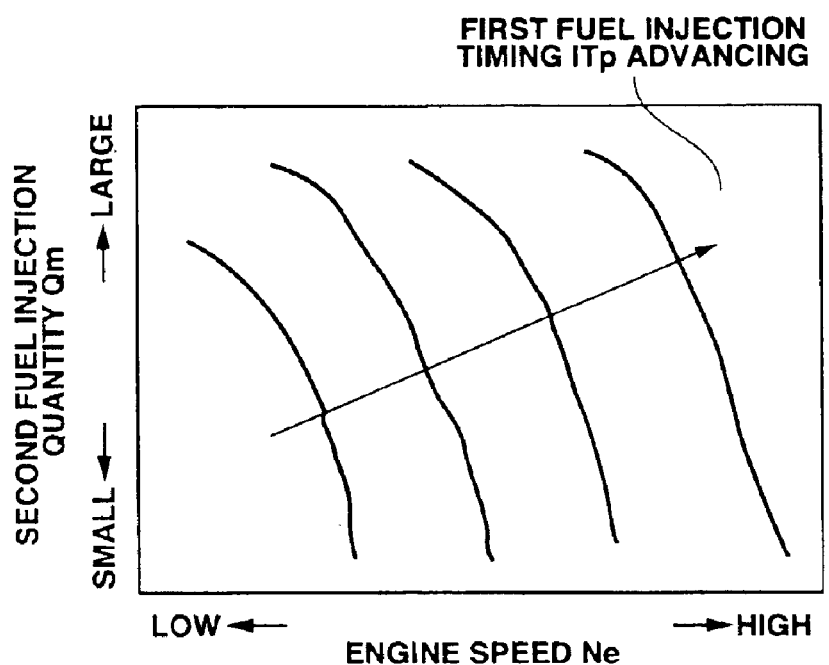
FIG. 20 is a representation of a map of a relationship among a first fuel injection timing ITp, the engine speed Ne, and second fuel injection quantity Qm in accordance with the embodiment of the present invention.
Figure 21:
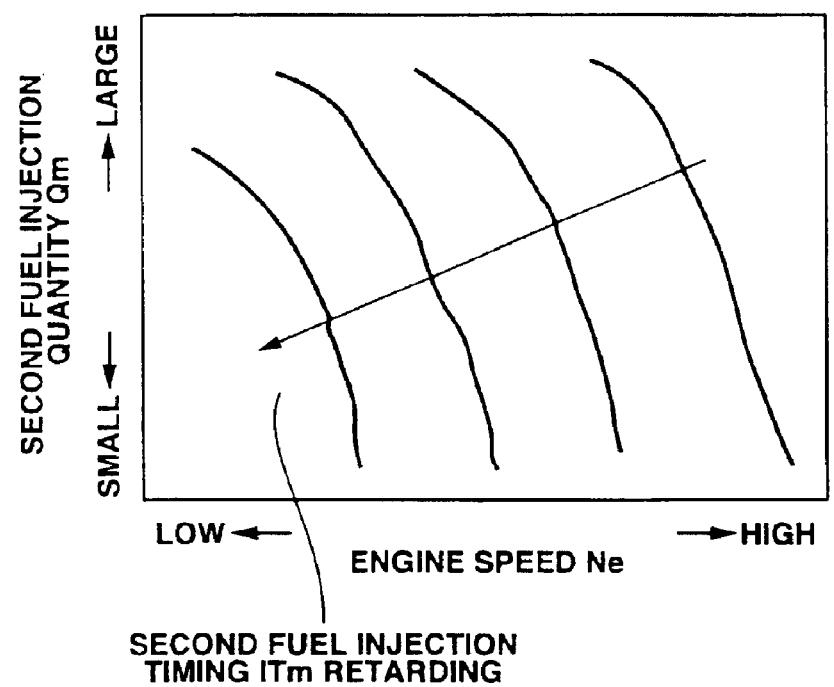
FIG. 21 is a representation of a map of a relationship among a second fuel injection timing ITm, engine speed Ne, and second fuel injection quantity Qm in accordance with the embodiment of the present invention.

At step S102, ECU 41 controls excess air ratio λ to target excess air ratio tλ, which is determined in accordance with PM quantity PMQ in DPF 33. Excess air ratio λ is controlled by actuating throttle valve 15 and EGR valve 35. A target excess air ratio in PM regeneration tλreg is calculated or retrieved from a table as shown in FIG. 18 as a function of PM quantity PMQ. Target excess air ratio tλreg decreases with increasing PM quantity PMQ. Target excess air ratio tλreg is generally within a rage from 1 to 1.4, in the shown embodiment. Reference intake air quantity tQac0, which is corresponding to the stoichiometric air excess ratio, is calculated or retrieved from a map as shown in FIG. 19 as a function of engine speed Ne and second fuel injection quantity Qm. Reference intake air quantity tQac0 increases with increasing engine speed Ne and increasing second fuel injection quantity Qm. Reference intake air quantity tQac0 is multiplied by target excess air ratio tλreg to produce a target intake air quantity tQac (tQac=tQac0×tλreg). ECU 41 controls throttle valve 15 in accordance with target intake air quantity tQac. The difference between an actual excess air ratio and target excess air ratio tλreg is determined based on a feedback signal from oxygen sensor 52. ECU 41 controls EGR valve 35 to reduce the difference. PM quantity PMQ is estimated based on exhaust gas pressure Pexh. First fuel injection timing ITp is calculated or retrieved from a map as shown in FIG. 20 as a function of engine speed Ne and second fuel injection quantity Qm. First fuel injection timing ITp is advanced with increasing engine speed Ne and increasing second fuel injection quantity Qm. Second fuel injection timing ITm is calculated or retrieved from a map as shown in FIG. 21 as a function of engine speed Ne and second fuel injection quantity Qm. Second fuel injection timing ITm is retarded with decreasing engine speed Ne and decreasing second fuel injection quantity Qm.

Figure 22:
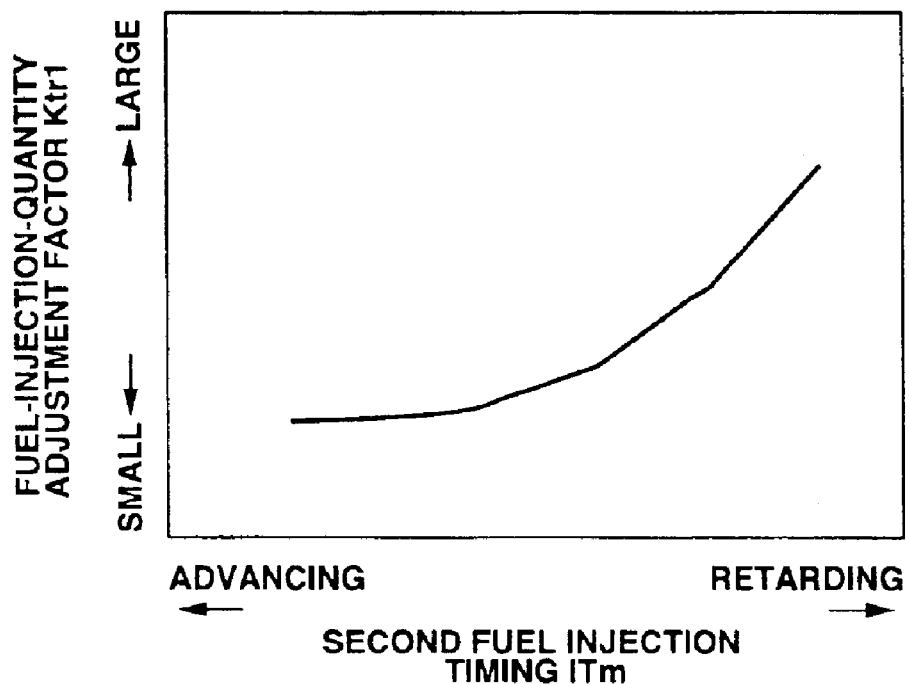
FIG. 22 is a representation of a table of a relationship between a fuel injection quantity adjustment factor Ktr1 and second fuel injection timing ITm in accordance with the embodiment of the present invention.
Figure 23:
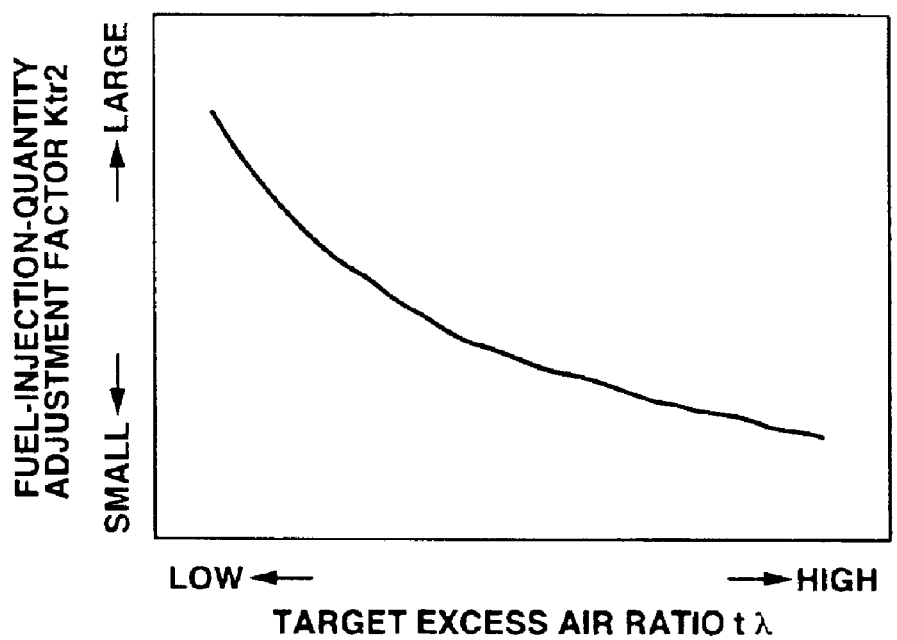
FIG. 23 is a representation of a table of a relationship between a fuel injection quantity adjustment factor Ktr2 and target excess air ratio $t\lambda$ in accordance with the embodiment of the present invention.

Thus, second fuel injection timing ITm is much later than the start timing of main fuel injection in the normal combustion mode. Accordingly, second fuel injection quantity Qm and target intake air quantity tQac are adjusted in accordance with second fuel injection timing ITm, to reduce a change of engine output torque in accordance with retarding second fuel injection timing ITm. A fuel injection quantity adjustment factor Ktr1 is calculated or retrieved from a table as shown in FIG. 22 as a function of second fuel injection timing ITm. Second fuel injection quantity Qm is multiplied by fuel injection quantity adjustment factor Ktr1 to produce an adjusted second fuel injection quantity Qm. Fuel injection quantity adjustment factor Ktr1 increases with retarding second fuel injection timing ITm. In addition, second fuel injection quantity Qm and target intake air quantity tQac are adjusted in accordance with target excess air ratio tλ to reduce an increase in pumping loss in accordance with decreasing excess air ratio. Second fuel injection quantity Qm is multiplied by fuel injection quantity adjustment factor Ktr2 to produce an adjusted second fuel injection quantity Qm. A fuel injection quantity adjustment factor Ktr2 is calculated or retrieved from a table as shown in FIG. 23 as a function of target excess air ratio tλ.

At step S103, a check is made to determine whether DPF temperature Tdpf is enough to burn PM in DPF 33. Actually, it is determined whether or not DPF temperature Tdpf is higher than or equal to a predetermined threshold temperature T21 such as 600° C. When the answer to step S103 is YES, the routine proceeds to step S104. On the other hand, when the answer to step S103 is NO, the routine proceeds to step S108.

At step S108, ECU 41 retards second fuel injection timing ITm based on a map as shown in FIG. 21, to raise the exhaust gas temperature. Next, the routine proceeds to step S109.

At step S109, ECU 41 determines fuel injection quantity adjustment factor Ktr1 based on second fuel injection timing ITm determined through S108, using a map as shown in FIG. 22. Second fuel injection quantity Qm is multiplied by fuel injection quantity adjustment factor Ktr1 to produce an adjusted second fuel injection quantity Qm. Next, the routine returns.

At step S104, a check is made to determine whether or not DPF temperature Tdpf is lower than or equal to a predetermined threshold temperature T22. Temperature T22 is set to a temperature below which thermal load applied to DPF 33 is within acceptable limits, such as 700° C. When the answer to step S104 is YES, the routine proceeds to step S105. On the other hand, when the answer to step S104 is NO, the routine proceeds to step S110.

At step S110, ECU 41 retards second fuel injection timing ITm based on a map as shown in FIG. 21, to raise the exhaust gas temperature. Next, the routine proceeds to step S111.

At step S111, ECU 41 determines fuel injection quantity adjustment factor Ktr1 based on second fuel injection timing ITm determined through S110, using a map as shown in FIG. 22. Second fuel injection quantity Qm is multiplied by fuel injection quantity adjustment factor Ktr1 to produce an adjusted second fuel injection quantity Qm. Next, the routine returns.

At step S105, a check is made to determine whether or not a predetermined time period treg is elapsed after the split retard combustion mode starts at step S108 or S110. When the answer to step S105 is YES, the routine proceeds to step S106. On the other hand, when the answer to step S105 is NO, the routine returns. PM is burned during DPF temperature Tdpf being held within the target range, that is, between temperatures T21 and T22.

At step S106, PM regeneration flag Freg is reset to zero, to switch the operating mode to the normal combustion mode. PM quantity PMQ is also reset to zero. Next, the routine proceeds to step S107.

At step S107, breakdown avoidance flag Frec is set to 1. With breakdown avoidance flag Frec set, the engine is operated preventing breakdown or overheating of DPF 33. If excess air ratio is immediately set to a normal value λ with part of PM unburned, there is a possibility that unburned PM is rapidly burned to impose a large heat load to DPF 33.

Referring now to FIG. 20, there is shown a flow chart depicting a process of S regeneration. S regeneration is implemented by controlling exhaust gas to fuel-rich condition to supply reducing agent to NOx trap 32, and by raising the exhaust gas temperature to promote dissociation of S. Actually, the engine is operated in the split retard combustion mode to execute S regeneration. In the shown embodiment, NOx trap 32 includes a catalyst of the Ba type. It is necessary to raise the catalyst over 650° C. for S regeneration. This routine determines first fuel injection timing ITp and second fuel injection timing ITm.

At step S201, ECU 41 reads NOx trap temperature Tnox. Next, the routine proceeds to step S202.

At step S202, ECU 41 controls excess air ratio λ to target excess air ratio tλdesul (=1, in the shown embodiment). Excess air ratio λ is controlled by actuating throttle valve 15 and EGR valve 35. Reference intake air quantity tQac0, which is corresponding to the stoichiometric air excess ratio, is calculated or retrieved from a map as shown in FIG. 19 as a function of engine speed Ne and second fuel injection quantity Qm. Reference intake air quantity tQac (tQac=tQac0) increases with increasing engine speed Ne and increasing second fuel injection quantity Qm. ECU 41 controls throttle valve 15 in accordance with target intake air quantity tQac. First fuel injection timing ITp is calculated or retrieved from a map as shown in FIG. 20 as a function of engine speed Ne and second fuel injection quantity Qm. Second fuel injection timing ITm is determined using maps as shown in FIG. 21. Fuel injection quantity adjustment factor Ktr1 and fuel injection quantity adjustment factor Ktr2 for reducing an increase in pumping loss are derived from tables as shown in FIGS. 22 and 23. Second fuel injection quantity Qm is multiplied by fuel injection quantity adjustment factor Ktr1 and fuel injection quantity adjustment factor Ktr2 to produce an adjusted second fuel injection quantity Qm.

At step S203, a check is made to determine whether or not NOx trap temperature Tnox is higher than or equal to a predetermined threshold temperature T13. Temperature T13 is set to a minimum temperature needed to dissociate S, such as 650° C. When the answer to step S203 is YES, the routine proceeds to step S204. On the other hand, when the answer to step S203 is NO, the routine proceeds to step S208.

At step S208, ECU 41 retards second fuel injection timing ITm based on a map as shown in FIG. 21, to raise the exhaust gas temperature. Next, the routine proceeds to step S209.

At step S209, ECU 41 determines fuel injection quantity adjustment factor Ktr1 based on second fuel injection timing ITm determined through step S208, using a map as shown in FIG. 22. Second fuel injection quantity Qm is multiplied by fuel injection quantity adjustment factor Ktr1 to produce an adjusted second fuel injection quantity Qm. Next, the routine returns.

At step S204, a check is made to determine whether or not a predetermined time period tdesul is elapsed after the split retard combustion mode starts at step S208. When the answer to step S204 is YES, the routine proceeds to step S205. On the other hand, when the answer to step S204 is NO, the routine returns. S is dissociated and released from NOx trap 32 during NOx trap temperature Tnox being held within the target range, that is, above T13. Released from NOx trap 32, S is purified by reducing agent in exhaust gas.

At step S205, S regeneration flag Fdesul is reset to zero, to switch the operating mode to the normal combustion mode. S quantity SOX is also reset to zero. Next, the routine proceeds to step S206.

At step S206, NOx quantity NOX is reset to zero, and NOx regeneration request flag rqSP reset to zero. Next, the routine proceeds to step S206.

At step S207, breakdown avoidance flag Frec is set to 1. With breakdown avoidance flag Frec set, the engine is operated preventing breakdown of DPF 33. If excess air ratio is immediately set to a normal value λ with PM partly unburned, there is a possibility that PM unburned is rapidly burned to impose a large heat load to DPF 33.

Figure 25:
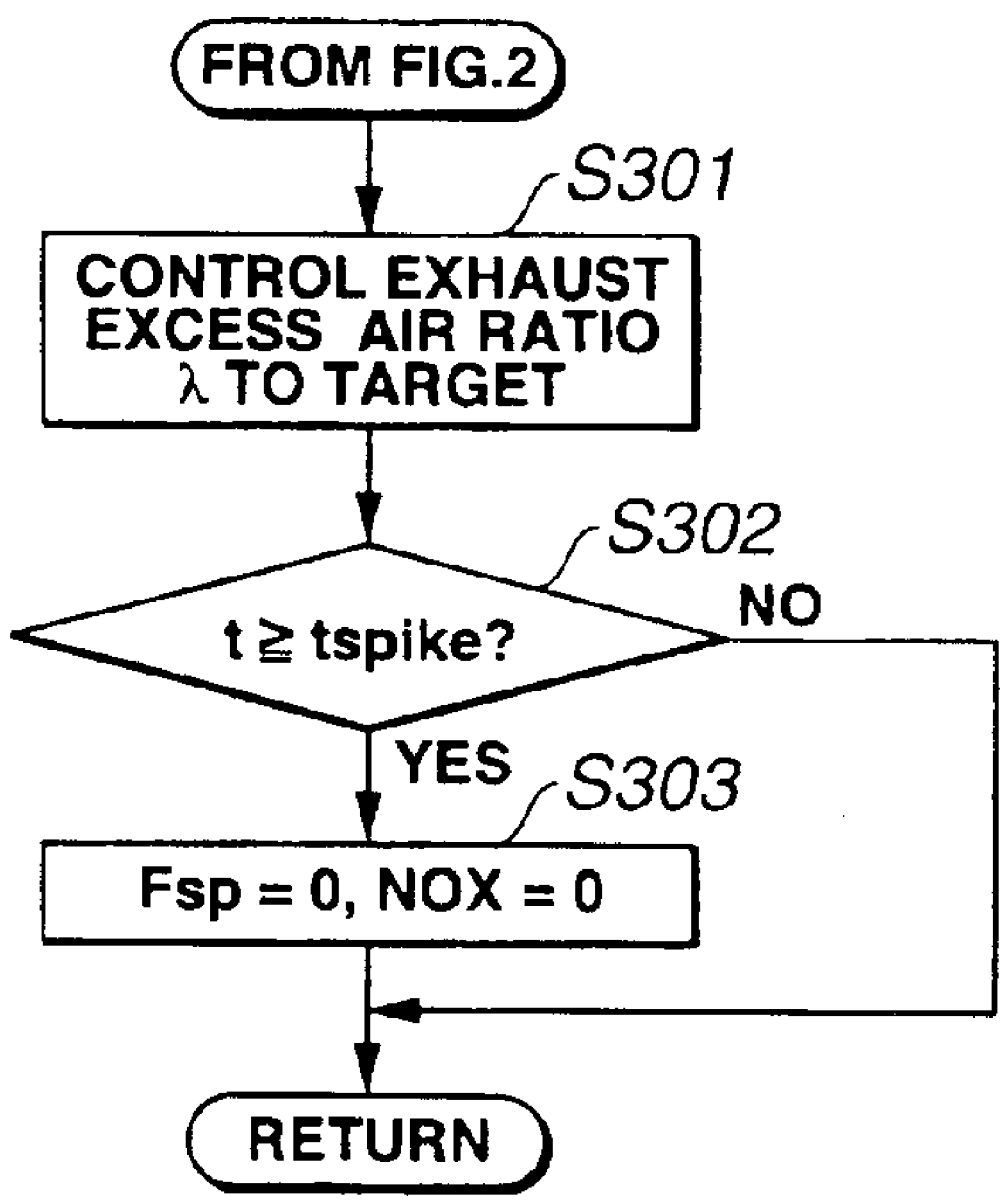
FIG. 25 is a flow chart depicting a process of NOx regeneration in accordance with the embodiment of the present invention.

Referring now to FIG. 25, there is shown a flow chart depicting a process of NOx regeneration. NOx regeneration is implemented by controlling exhaust gas to fuel-rich condition to supply reducing agent to NOx trap 32. Actually, the engine is operated in the split retard combustion mode to execute NOx regeneration. In NOx regeneration, it is not desired to raise the exhaust gas temperature as in S regeneration. On the other hand, the intake air quantity is decreased in NOx regeneration, to decrease the exhaust air fuel ratio, which tends to decrease the compression end temperature. Therefore, the split retard combustion mode is employed for countering this difficulty. This routine determines first fuel injection timing ITp and second fuel injection timing ITm.

At step S301, ECU 41 controls excess air ratio λ to target excess air ratio tλsp, which is determined for NOx regeneration. Target excess air ratio tλsp is set to a value lower than 1, such as 0.9, which indicates a fuel rich condition. Excess air ratio λ is controlled by actuating throttle valve 15 and EGR valve 35. Reference intake air quantity tQac0, which is corresponding to the stoichiometric air excess ratio, is calculated or retrieved from a map as shown in FIG. 19 as a function of engine speed Ne and second fuel injection quantity Qm. Reference intake air quantity tQac0 is multiplied by target excess air ratio tλsp to produce a target intake air quantity tQac (tQac=tQac0×tλsp). ECU 41 controls throttle valve 15 in accordance with target intake air quantity tQac. The difference between an actual excess air ratio and target excess air ratio tλreg is determined based on a feedback signal from oxygen sensor 52. ECU 41 controls EGR valve 35 to reduce the difference. First fuel injection timing ITp is calculated or retrieved from a map as shown in FIG. 20 as a function of engine speed Ne and second fuel injection quantity Qm. Second fuel injection timing ITm is determined based on maps as shown in FIG. 21. Fuel injection quantity adjustment factor Ktr1 and fuel injection quantity adjustment factor Ktr2 for reducing an increase in pumping loss are derived from tables as shown in FIGS. 22 and 23. Second fuel injection quantity Qm is multiplied by fuel injection quantity adjustment factor Ktr1 and fuel injection quantity adjustment factor Ktr2 to produce an adjusted second fuel injection quantity Qm.

At step S302, a check is made to determine whether or not a predetermined time period tspike is elapsed after the split retard combustion mode. NOx is dissociated and released from NOx trap 32 during time period tspike. Released from NOx trap 32, NOx is purified by reducing agent in exhaust gas. When the answer to step S302 is YES, the routine proceeds to step S303. On the other hand, when the answer to step S302 is NO, the routine returns.

At step S303, NOx regeneration flag Fsp is reset to zero, to switch the operating mode to the normal combustion mode. NOx quantity NOX is also reset to zero. Next, the routine returns.

Figure 26:
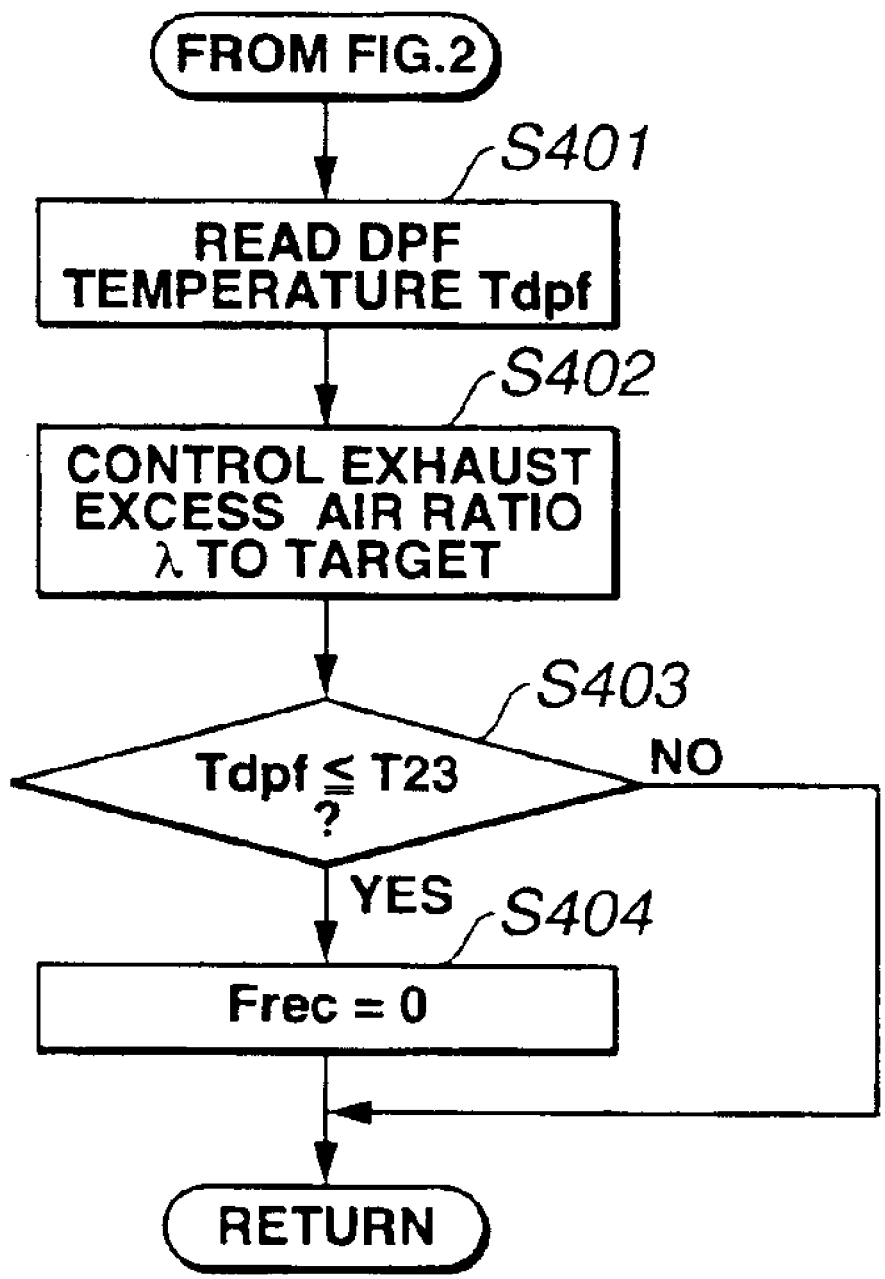
FIG. 26 is a flow chart depicting a process of avoiding damage in the exhaust purifier in accordance with the embodiment of the present invention.

Referring now to FIG. 26, there is shown a flow chart depicting a process of breakdown avoidance operation. Breakdown avoidance operation is implemented by controlling excess air ratio λ to a value higher than or equal to a value such as 1.4 (fuel-lean condition), which is higher than in PM regeneration or S regeneration. The normal combustion mode is employed to decrease the exhaust gas temperature.

At step S401, ECU 41 reads DPF temperature Tdpf. Next, the routine proceeds to step S402.

Figure 27:
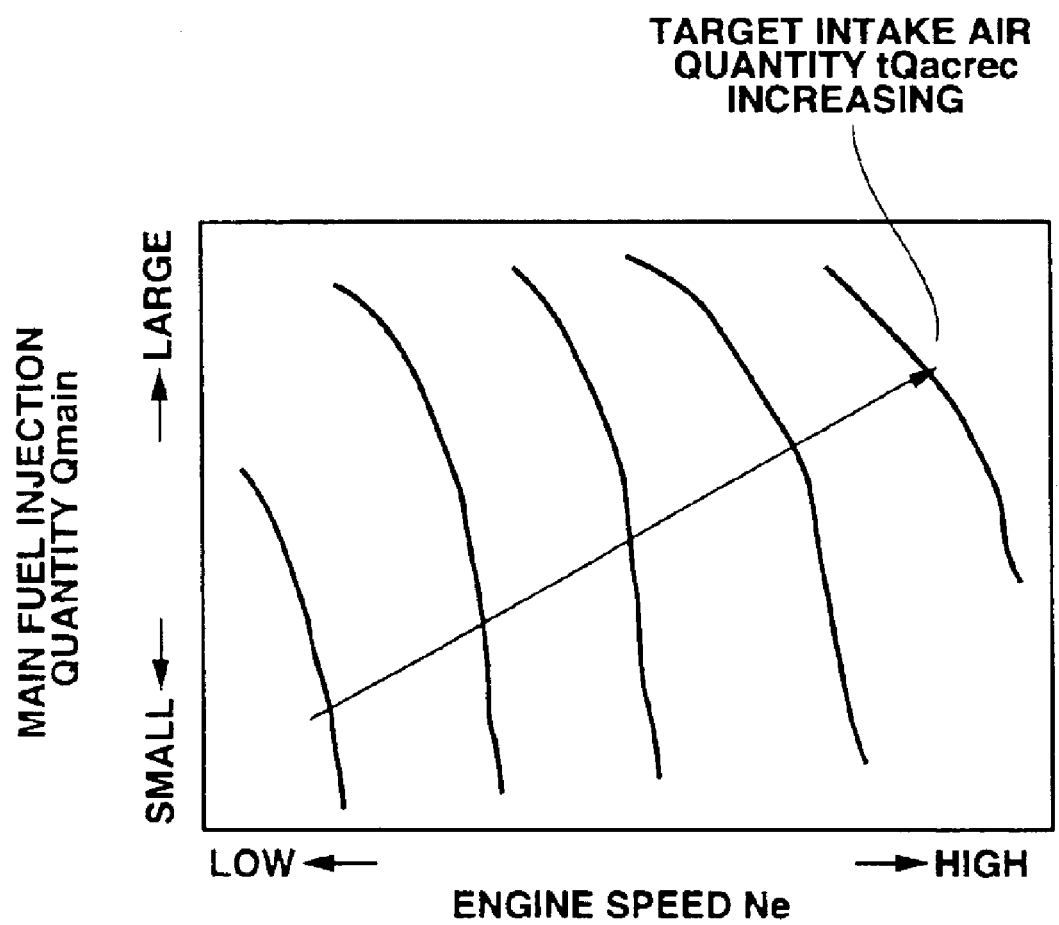
FIG. 27 is a representation of a map of a relationship among a target intake air quantity in breakdown avoidance mode tQacrec, engine speed Ne, and a main fuel injection quantity Qmain in accordance with the embodiment of the present invention.

At step S402, ECU 41 controls excess air ratio λ to target excess air ratio tλrec, which is determined for breakdown avoidance operation. Target intake air quantity tQacrec is calculated or retrieved from a map as shown in FIG. 27 as a function of engine speed Ne and main fuel injection quantity Qmain. Next, the routine proceeds to step S403.

At step S403, a check is made to determine whether or not DPF temperature Tdpf is lower than or equal to a predetermined temperature T23. When the answer to step S302 is YES, it is determined that there is no possibility of burning unburned PM rapidly, and the routine proceeds to step S404. On the other hand, when the answer to step S403 is NO, the routine returns.

At step S404, breakdown avoidance flag Frec is reset to zero, to switch the operating mode to the normal combustion mode. Next, the routine returns.

Figure 30:
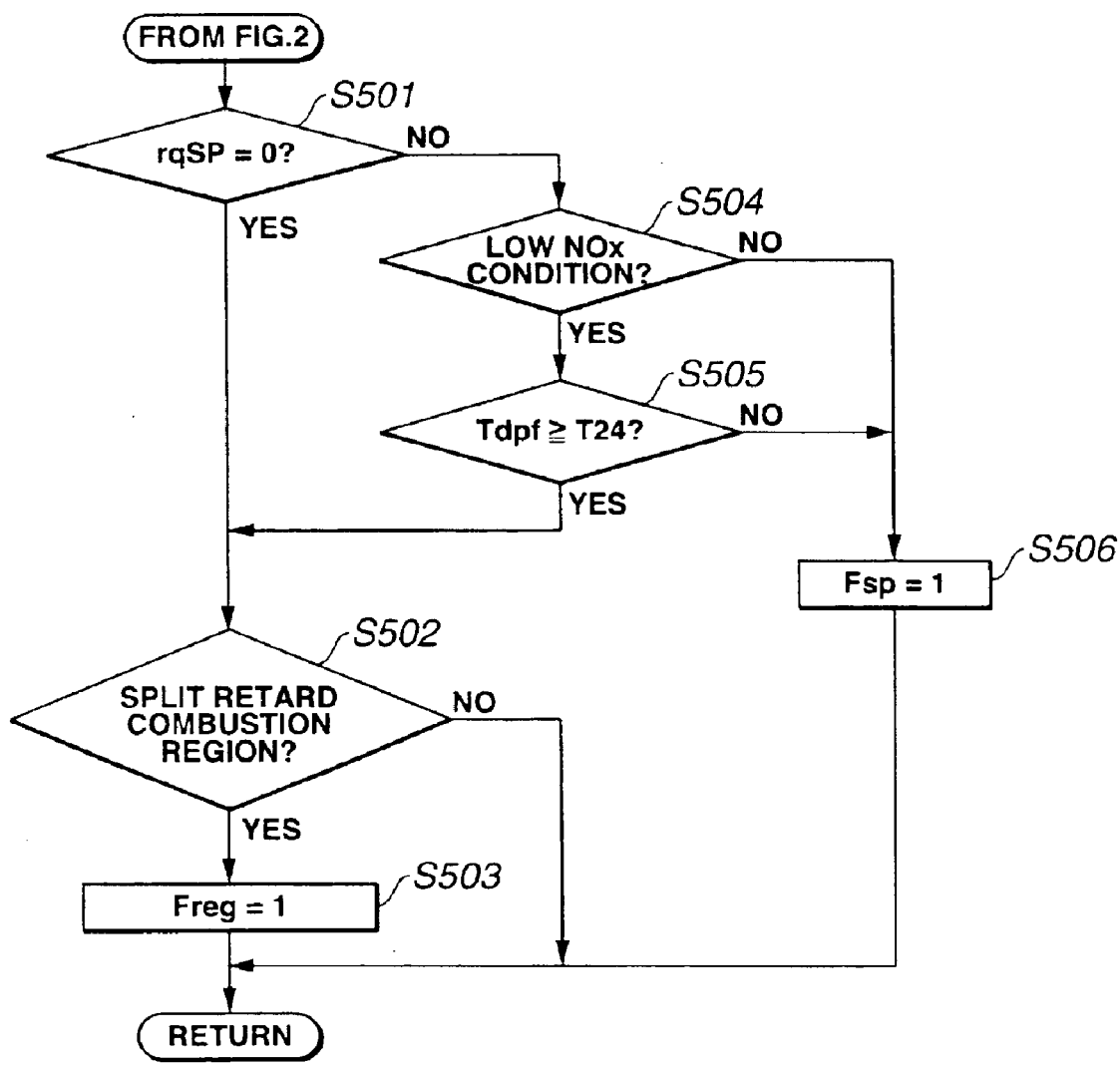
FIG. 30 is a flow chart depicting a second process of setting operating mode flags in accordance with the embodiment of the present invention.
Figure 31:
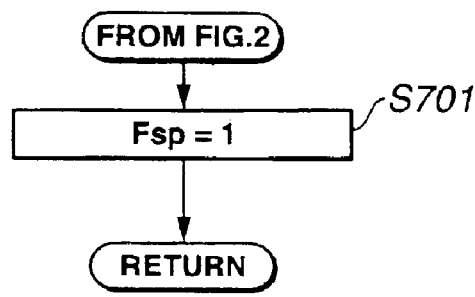
FIG. 31 is a flow chart depicting a third process of setting operating mode flags in accordance with the embodiment of the present invention.

Referring now to FIGS. 28, 30, and 31, there is shown a process of setting regeneration flags. One of these routines is executed when at least one of PM regeneration request flag rqREG, S regeneration request flag rqDESUL, and NOx regeneration request flag rqSP is switched to 1. These routines determine a priority or an execution order of operations and set PM regeneration flag Freg, S regeneration flag Fdesul, or NOx regeneration flag Fsp, when a plurality of request flag are set.

The routine shown in FIG. 28 is executed when S regeneration request flag rqDESUL is equal to 1. At step S601, a check is made to determine whether or not PM regeneration request flag rqREG is equal to zero. When the answer to step S601 is YES, the routine proceeds to step S603. On the other hand, when the answer to step S601 is NO, the routine proceeds to step S602.

At step S602, PM regeneration flag Freg is set to 1. Next, the routine returns.

At step S603, a check is made to determine whether or not NOx trap temperature Tnox is higher than or equal to a predetermined threshold temperature T14. Temperature T14 is set to a minimum temperature at which the mode shift to S regeneration condition can be smoothly performed in a comparable short time period, and lower than target temperature for S regeneration T13. When the answer to step S603 is YES, the routine proceeds to step S604. On the other hand, when the answer to step S603 is NO, the routine proceeds to step S606.

Figure 29:
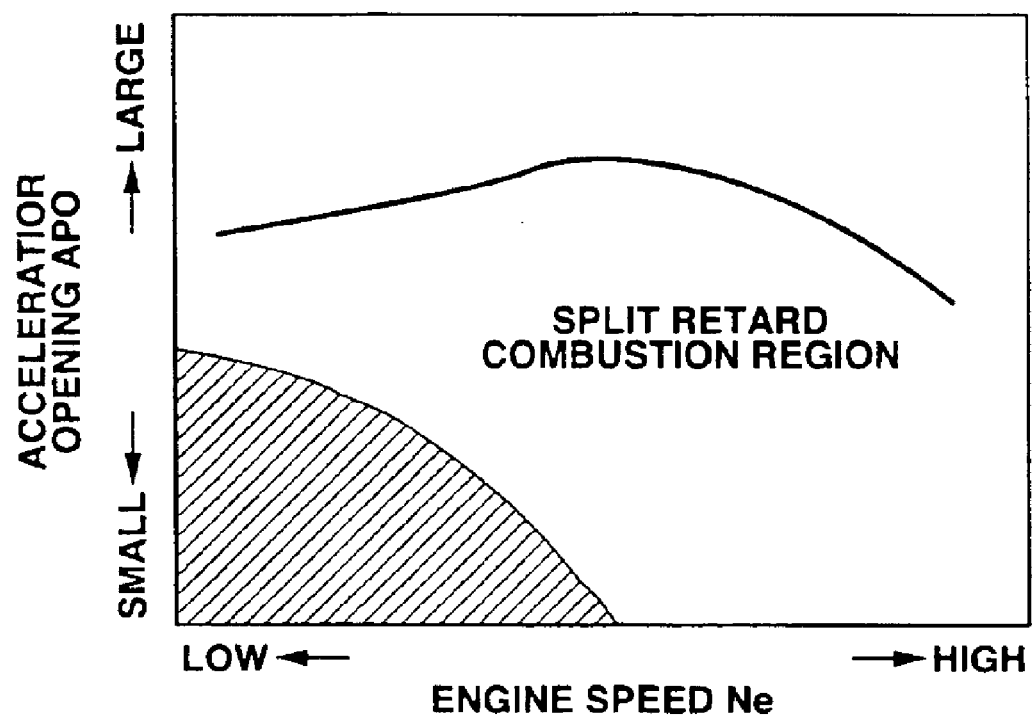
FIG. 29 is a representation of a map of a split retard combustion region in which the split retard combustion mode can be employed in accordance with the embodiment of the present invention.

At step S604, a check is made to determine whether or not the current operating condition is within the split retard combustion region in which the split retard combustion mode can be employed. The split retard combustion region is defined in accordance with engine speed Ne and accelerator opening APO based on a map as shown in FIG. 29. When the answer to step S604 is YES, the routine proceeds to step S605. On the other hand, when the answer to step S604 is NO, the routine returns.

At step S605, S regeneration flag Fdesul is set to 1. Next the routine returns.

At step S606, a check is made to determine whether or not NOx regeneration request flag rqSP is equal to zero. When the answer to step S606 is YES, the routine proceeds to step S604. On the other hand, when the answer to step S606 is NO, the routine proceeds to step S607, at which NOx regeneration flag Fsp is set to 1, and next returns. NOx regeneration gains a higher priority than S regeneration.

The routine shown in FIG. 30 is executed when PM regeneration request flag rqREG is equal to 1 and S regeneration request flag rqDESUL is equal to zero. At step S501, a check is made to determine whether or not NOx regeneration request flag rqSP is equal to zero. When the answer to step S501 is YES, the routine proceeds to step S502. On the other hand, when the answer to step S501 is NO, the routine proceeds to step S504.

At step S502, a check is made to determine whether or not the current operating condition is within a split retard combustion region in which the split retard combustion mode can be employed. The split retard combustion region is defined in accordance with engine speed Ne and accelerator opening APO based on a map as shown in FIG. 29. Under low speed and low load conditions, the mode shift to the split retard combustion mode is inhibited. When the answer to step S502 is YES, the routine proceeds to step S503. On the other hand, when the answer to step S502 is NO, the routine returns.

At step S503, PM regeneration flag Freg is set to 1. Next, the routine returns.

At step S504, a check is made to determine whether or not engine 1 is operated under a low NOx condition where the quantity of NOx in exhaust gas is small. It is determined, for example, in accordance with whether or not the operating condition of engine 1 is in a steady operating condition. That is, it is determined that NOx quantity is small during engine 1 being operated in a steady condition. When the answer to step S504 is YES, the routine proceeds to step S505. On the other hand, when the answer to step S504 is NO, the routine returns.

At step S505, a check is made to determine whether or not DPF temperature Tdpf is higher than or equal to a predetermined threshold temperature T24. Temperature T24 is set to a temperature at which DPF 33 is activated, below target temperature in PM regeneration T21. When the answer to step S505 is YES, the routine proceeds to step S502. On the other hand, when the answer to step S505 is NO, it is determined it takes a comparable time period to increase DPF temperature Tdpf, and the routine proceeds to step S506.

At step S506, NOx regeneration flag Fsp is set to 1.

The routine shown in FIG. 31 is executed when PM regeneration request flag rqREG and S regeneration request flag rqDESUL are equal to zero and NOx regeneration request flag rqSP is equal to 1. Therefore, NOx regeneration flag Fsp is set to 1.

Figure 35:
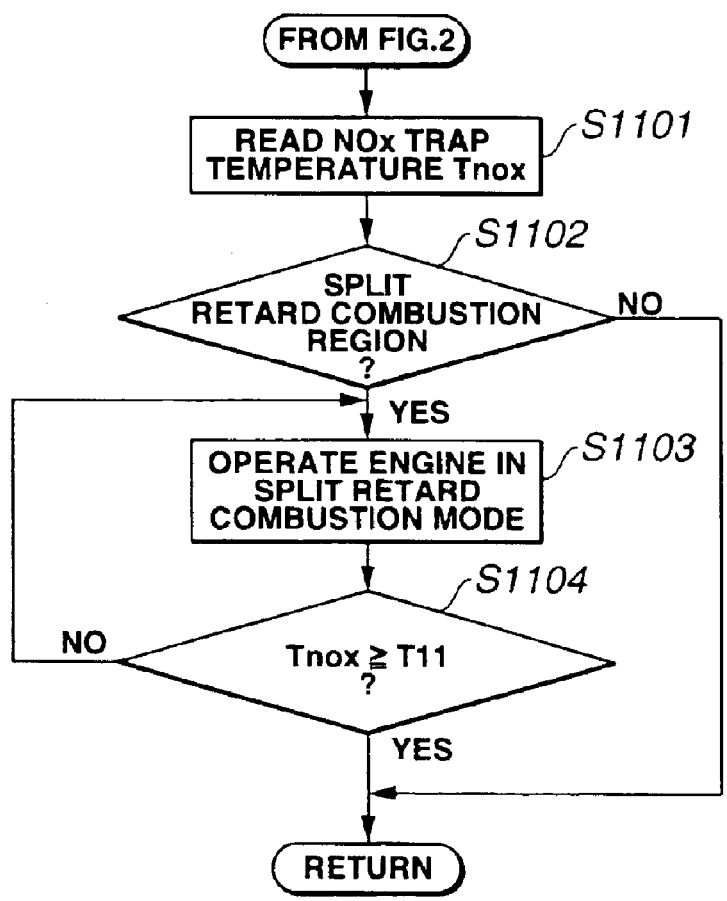
FIG. 35 is a flow chart depicting a process of rapid activation of the exhaust purifier in accordance with the embodiment of the present invention.

Referring now to FIG. 35, there is shown a process of rapid activation of the exhaust purifier. At step S1101, ECU 41 reads NOx trap temperature Tnox. Next, the routine proceeds to step S1102.

At step S1102, a check is made to determine whether or not the current operating condition is within the split retard combustion region by referring to a map as shown in FIG. 29. When the answer to step S1102 is YES, the routine proceeds to step S1103. On the other hand, when the answer to step S1102 is NO, the routine returns.

At step S1103, ECU 41 controls the engine system to the split retard combustion mode. In the split retard combustion mode, ECU 41 determines first fuel injection timing ITp and second fuel injection timing ITm based on maps shown in FIGS. 20 and 21. Retarding second fuel injection timing ITm results in raising the exhaust gas temperature and activating NOx trap 32. In addition, fuel injection quantity adjustment factor Ktr1 is determined based on a map as shown in FIG. 22. Second fuel injection quantity Qm is multiplied by fuel injection quantity adjustment factor Ktr1 to produce an adjusted second fuel injection quantity Qm. In the rapid activation, target excess air ratio $t\lambda$ is set to a normal value as in the normal combustion mode. Next, the routine proceeds to step S1104.

At step S1104, a check is made to determine whether or not NOx trap temperature Tnox is higher than or equal to the threshold temperature T11. When the answer to step S1104 is YES, the routine returns. On the other hand, when the answer to step S1104 is NO, the routine repeats step S1103. After the routine returning, the combustion mode is shifted to the normal combustion mode (step S16).

The following describes effects produced by a combustion control apparatus for internal combustion engine in accordance to the embodiment of the present invention. First, PM regeneration of DPF 33, S regeneration, NOx regeneration, and the rapid activation, of NOx trap 32 are implemented by shifting the engine operating mode to the split retard combustion mode, in which the second fuel injection is executed at a late timing or crank angle than the main fuel injection in the normal combustion mode. This results in raising the exhaust gas temperature to warm NOx trap 32 to a target temperature. In PM regeneration mode or S regeneration mode, exhaust air fuel ratio is lowered by decreasing intake air quantity. The first fuel injection causes the preliminary combustion, which releases heat to raise incylinder temperature. This leads to a stable process of the main combustion.

Second, time interval Δtij between first and second fuel injection is adjusted so that the start timing of the main combustion follows the end timing of preliminary combustion. This raises the proportion of the premixed combustion. Lowering the excess air ratio in PM regeneration, NOx regeneration, and S regeneration reduces exhaust smoke, because the premixed combustion predominates in the main combustion.

Third, second target EGR rate tRegr2 for the split retard combustion mode is set to a value lower than first target EGR rate tRegr1, for any operating condition, that is, for any combination of engine speed Ne and fuel injection quantity request Qfdrv. In the split retard combustion mode, the fuel injection timing is later than in the normal combustion mode, which leads to a lower combustion temperature and a smaller quantity of exhausted NOx. Accordingly, the EGR rate needed to limit the NOx exhaust quantity in the split retard combustion mode is lower than in the normal combustion mode. Decreasing target EGR rate tRegr2 results in promoting the premixed combustion to reduce exhaust smoke with the NOx exhaust quantity compliant with emission standards. When target excess air ratio tλ is set to a value higher than 1, that is, in PM regeneration, and in the rapid activation, target EGR rate tRegr is set to second target EGR rate tRegr2 (step S65). In PM regeneration, reducing the quantity of exhaust smoke generated leads to a decrease in the quantity of exhaust smoke flowing into DPF 33, resulting in an operation of burning PM in DPF 33 quickly and completely. In the rapid activation, the quantity of PM that is accumulated in DPF 33 during the operation of the rapid activation is decreased, to increase the interval of PM regeneration.

When target excess air ratio tλ is set to a value lower than or equal to 1, that is, in S regeneration, and in NOx regeneration, target EGR rate tRegr is set to third target EGR rate tRegr3. Third target EGR rate tRegr3 is determined in view of the stability of combustion and fuel economy, in contrast to target EGR rates tRegr1, and tRegr2, which are determined in view of limiting NOx exhaust quantity.

In the shown embodiment, the engine includes separate NOx trap 32 and DPF 33. Alternatively, the engine may include an integral exhaust purifier. For example, the catalyst of NOx trap may be mounted on the filter element of DPF 33.

This application is based on a prior Japanese Patent Application No. 2003-284328 filed Jul. 31, 2003. The entire contents of this Japanese Patent Application No. 2003-284328 are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A combustion control apparatus for an internal combustion engine, comprising:
an exhaust purifier in an exhaust passage of the engine;
a combustion controlling actuator for causing combustion in a combustion chamber of the engine;
a controller for controlling the combustion controlling actuator; and
the controller configured to perform the following:
switching a combustion mode between a normal combustion mode and a split retard combustion mode, in accordance with an condition of the exhaust purifier;
determining a first EGR rate for the normal combustion mode and a second EGR rate lower than the first EGR rate for the split retard combustion mode, in accordance with an operating point of the engine;
performing the following in the normal combustion mode:
producing normal combustion to generate an output torque of the engine; and
recirculating exhaust gas to the combustion chamber at the first EGR rate; and
performing the following in the split retard combustion mode:
producing preliminary combustion at or near top dead center, to release a predetermined quantity of heat in the combustion chamber;
starting main combustion at a timing later than a start timing of the normal combustion in the normal combustion mode, after an end of the preliminary combustion, to generate the output torque of the engine; and
recirculating exhaust gas to the combustion chamber at the second EGR rate.

2. A combustion control apparatus for an internal combustion engine, comprising:
a fuel injector for injecting fuel directly into a combustion chamber of the engine;
an EGR device for recirculating exhaust gas to the combustion chamber;
a controller for controlling the fuel injector, and for controlling the EGR device; and
the controller configured to perform the following:
switching a combustion mode between a normal combustion mode and a split retard combustion mode, in accordance with an operating condition of the engine;
determining two different EGR rates of a first EGR rate for the normal combustion mode and a second EGR rate for the split retard combustion mode, in accordance with an operating point of the engine;
performing the following in the normal combustion mode:
controlling a normal fuel injection to produce normal combustion to generate an output torque of the engine; and
recirculating exhaust gas to the combustion chamber at the first EGR rate; and
performing the following in the split retard combustion mode:
controlling a first fuel injection to produce preliminary combustion at or near top dead center, to release a predetermined quantity of heat;
starting a second fuel injection at a timing later than a start timing of the normal fuel injection in the normal combustion mode, to start main combustion after an end of the preliminary combustion, to generate the output torque of the engine; and
recirculating exhaust gas to the combustion chamber at the second EGR rate.

3. The combustion control apparatus as claimed in claim 2, further comprising a condition sensor for collecting information needed to determine the operating condition of the engine.

4. The combustion control apparatus as claimed in claim 3, wherein the second EGR rate is lower than the first EGR rate, at each operating point of the engine.

5. The combustion control apparatus as claimed in claim 4, wherein: the condition sensor senses an engine speed of the engine; and the controller is configured to perform the following:

determining a fuel injection quantity of fuel injection to generate the output torque of the engine, in accordance with the operating condition of the engine; and determining the operating point of the engine, based on the engine speed and the fuel injection quantity.

6. The combustion control apparatus as claimed in claim 5, wherein the controller is configured to increase the second EGR rate in accordance with decreasing engine speed.

7. The combustion control apparatus as claimed in claim 5, wherein the controller is configured to increase the second EGR rate in accordance with decreasing fuel injection quantity.

8. The combustion control apparatus as claimed in claim 3, wherein the controller is configured to perform the following in the split retard combustion mode:

determining an excess air ratio in accordance with the operating condition of the engine; and recirculating exhaust gas to the combustion chamber at the second EGR rate, during the excess air ratio being higher than 1.

9. The combustion control apparatus as claimed in claim 8, wherein the controller is configured to decrease the second EGR rate in accordance with decreasing excess air ratio.

10. The combustion control apparatus as claimed in claim 3, further comprising an exhaust purifier in an exhaust gas passage of the engine, wherein the condition sensor senses information needed to determine the condition of the exhaust purifier; and the controller is configured to switch the combustion mode, in accordance with the condition of the exhaust purifier.

11. The combustion control apparatus as claimed in claim 10, wherein the condition of the exhaust purifier includes a quantity of a trapped substance in the exhaust purifier.

12. The combustion control apparatus as claimed in claim 10, wherein the exhaust purifier comprises at least one of a particulate filter and a NOx trap.

13. The combustion control apparatus as claimed in claim 12, wherein the exhaust purifier comprises one of the particulate filter and the NOx trap; and the controller is configured to perform the following:

producing a regeneration request for regenerating an associated one of the particulate filter and the NOx trap, in accordance with the condition of the exhaust purifier; and selecting the split retard combustion mode in response to the regeneration request.

14. The combustion control apparatus as claimed in claim 12, wherein the exhaust purifier comprises both of the particulate filter and the NOx trap; and the controller is configured to perform the following:

producing a PM regeneration request for regenerating the particulate filter, in accordance with the condition of the exhaust purifier;

producing a NOx regeneration request for regenerating the NOx trap, in accordance with the condition of the exhaust purifier; and selecting the split retard combustion mode in response to the PM regeneration request and the NOx regeneration request.

15. A combustion control apparatus for an internal combustion engine, comprising:

exhaust purifying means for purifying exhaust gas;

combustion controlling means for causing combustion in a combustion chamber of the engine;

control means for controlling the combustion controlling means; and the control means configured to perform the following:

switching a combustion mode between a normal combustion mode and a split retard combustion mode, in accordance with an condition of the exhaust purifying means;

determining a first EGR rate for the normal combustion mode and a second EGR rate lower than the first EGR rate for the split retard combustion mode, in accordance with an operating point of the engine;

performing the following in the normal combustion mode:

producing normal combustion to generate an output torque of the engine; and recirculating exhaust gas to the combustion chamber at the first EGR rate; and performing the following in the split retard combustion mode:

producing preliminary combustion at or near top dead center, to release a predetermined quantity of heat in the combustion chamber;

starting main combustion at a timing later than a start timing of the normal combustion in the normal combustion mode, after an end of the preliminary combustion, to generate the output torque of the engine; and recirculating exhaust gas to the combustion chamber at the second EGR rate.

16. A method of controlling combustion for an internal combustion engine including an exhaust purifier, the method comprising:

switching a combustion mode between a normal combustion mode and a split retard combustion mode, in accordance with an condition of the exhaust purifier;

determining a first EGR rate for the normal combustion mode and a second EGR rate lower than the first EGR rate for the split retard combustion mode, in accordance with an operating point of the engine;

performing the following in the normal combustion mode:

producing normal combustion to generate an output torque of the engine; and recirculating exhaust gas to the combustion chamber at the first EGR rate; and performing the following in the split retard combustion mode:

producing preliminary combustion at or near top dead center, to release a predetermined quantity of heat in the combustion chamber;

starting main combustion at a timing later than a start timing of the normal combustion in the normal combustion mode, after an end of the preliminary combustion, to generate the output torque of the engine; and recirculating exhaust gas to the combustion chamber at the second EGR rate.

* * * * *